US009774928B2

(12) United States Patent
Choi et al.

(10) Patent No.: US 9,774,928 B2
(45) Date of Patent: Sep. 26, 2017

(54) SYSTEM AND METHOD FOR PRODUCING AND EXECUTING INTERACTIVE BROADCAST PROGRAM

(71) Applicant: Korea Advanced Institute of Science and Technology, Daejeon (KR)

(72) Inventors: Jun Kyun Choi, Daejeon (KR); Jin Hong Yang, Daejeon (KR); Na Gyeong An, Daejeon (KR); Hyo Jin Park, Daejeon (KR); Hyo Ju Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/419,210

(22) PCT Filed: Dec. 6, 2012

(86) PCT No.: PCT/KR2012/010533
§ 371 (c)(1),
(2) Date: Feb. 2, 2015

(87) PCT Pub. No.: WO2014/021514
PCT Pub. Date: Feb. 6, 2014

(65) Prior Publication Data
US 2015/0208140 A1 Jul. 23, 2015

(30) Foreign Application Priority Data

Aug. 2, 2012 (KR) .................. 10-2012-0084703
Aug. 8, 2012 (KR) .................. 10-2012-0086636
Sep. 3, 2012 (KR) .................. 10-2012-0097127

(51) Int. Cl.
*H04N 7/10* (2006.01)
*H04N 21/8545* (2011.01)
*H04N 21/4788* (2011.01)
*H04N 7/14* (2006.01)
(Continued)

(52) U.S. Cl.
CPC .......... *H04N 21/8545* (2013.01); *H04N 7/14* (2013.01); *H04N 21/2385* (2013.01);
(Continued)

(58) Field of Classification Search
CPC . H04N 21/812; H04N 21/4331; H04N 21/435
(Continued)

(56) References Cited

U.S. PATENT DOCUMENTS 7,603,683 B2 * 10/2009 Reto ................. H04L 29/06027
709/204
8,299,889 B2 * 10/2012 Kumar ............... G06K 9/00885
340/13.24

(Continued)

*Primary Examiner* — Annan Shang
(74) *Attorney, Agent, or Firm* — Marshall, Gerstein & Borun LLP

(57) ABSTRACT

The present invention relates to a system and method for producing and executing an interactive broadcast program. A program enabler service system providing an interactive service for allowing users to participate in a broadcast program includes: a program-generating unit providing a tool for receiving broadcast program-related information so as to generate information received through the tool in a script format for the broadcast program; a program-executing unit providing information to users participating in the broadcast program through a communication channel provided by the service enabler after reading the information generated in the script format by interacting with the broadcast program; and a service-connecting unit connecting a communication service platform of the service enabler to the program-executing unit.

18 Claims, 39 Drawing Sheets

(51) Int. Cl.
*H04N 21/2385* (2011.01)
*H04N 21/2668* (2011.01)
*H04N 21/414* (2011.01)
*H04N 21/437* (2011.01)
*H04N 21/438* (2011.01)
*H04N 21/442* (2011.01)
*H04N 21/462* (2011.01)
*H04N 21/475* (2011.01)
*H04N 21/4782* (2011.01)
*H04N 21/4786* (2011.01)
*H04N 21/61* (2011.01)
*H04N 21/643* (2011.01)
*H04N 21/81* (2011.01)

(52) U.S. Cl.
CPC ... *H04N 21/2668* (2013.01); *H04N 21/41407* (2013.01); *H04N 21/437* (2013.01); *H04N 21/438* (2013.01); *H04N 21/44222* (2013.01); *H04N 21/4622* (2013.01); *H04N 21/4758* (2013.01); *H04N 21/4782* (2013.01); *H04N 21/4786* (2013.01); *H04N 21/4788* (2013.01); *H04N 21/6125* (2013.01); *H04N 21/6131* (2013.01); *H04N 21/6175* (2013.01); *H04N 21/6181* (2013.01); *H04N 21/64322* (2013.01); *H04N 21/8166* (2013.01); *H04N 21/8173* (2013.01)

(58) Field of Classification Search
USPC ............................ 725/32–36; 709/217–232
See application file for complete search history.

(56) References Cited

U.S. PATENT DOCUMENTS

| | | | | |
|---|---|---|---|---|
| 8,661,151 B2* | 2/2014 | Sharkey | ............ | G06F 17/30053 709/231 |
| 2003/0208752 A1* | 11/2003 | Farris | ............ | G09B 7/00 725/13 |
| 2004/0114036 A1* | 6/2004 | Karaoguz | ............ | G08B 13/19656 348/142 |
| 2004/0117837 A1* | 6/2004 | Karaoguz | ............ | H04H 60/46 725/86 |
| 2004/0199370 A1* | 10/2004 | Arama | ............ | H04L 41/145 703/20 |
| 2007/0094691 A1* | 4/2007 | Gazdzinski | ............ | H04N 7/17318 725/62 |
| 2007/0197261 A1* | 8/2007 | Humbel | ............ | G06Q 30/00 455/558 |
| 2008/0229368 A1* | 9/2008 | Lewis | ............ | H04N 7/17318 725/78 |
| 2009/0133071 A1* | 5/2009 | Sakai | ............ | H04N 5/4403 725/46 |
| 2009/0265245 A1* | 10/2009 | Wright | ............ | G06Q 30/02 705/14.66 |
| 2010/0272010 A1* | 10/2010 | Hicks, III | ............ | H04L 12/2838 370/328 |
| 2011/0085082 A1* | 4/2011 | Jing | ............ | H04L 12/2809 348/552 |
| 2011/0202956 A1* | 8/2011 | Connelly | ............ | H04N 21/433 725/38 |
| 2011/0247016 A1* | 10/2011 | Seong | ............ | G06F 8/447 719/328 |
| 2011/0320963 A1* | 12/2011 | Wong | ............ | H04N 21/631 715/755 |
| 2012/0042334 A1* | 2/2012 | Choi | ............ | H04N 21/454 725/32 |
| 2013/0091520 A1* | 4/2013 | Chen | ............ | H04N 21/25891 725/34 |
| 2013/0173517 A1* | 7/2013 | Berus | ............ | G06N 5/02 706/45 |
| 2013/0291037 A1* | 10/2013 | Im | ............ | H04N 21/4622 725/109 |
| 2014/0013342 A1* | 1/2014 | Swan | ............ | H04N 21/2343 725/5 |
| 2015/0334438 A1* | 11/2015 | Helms | ............ | H04L 12/2861 725/106 |

* cited by examiner

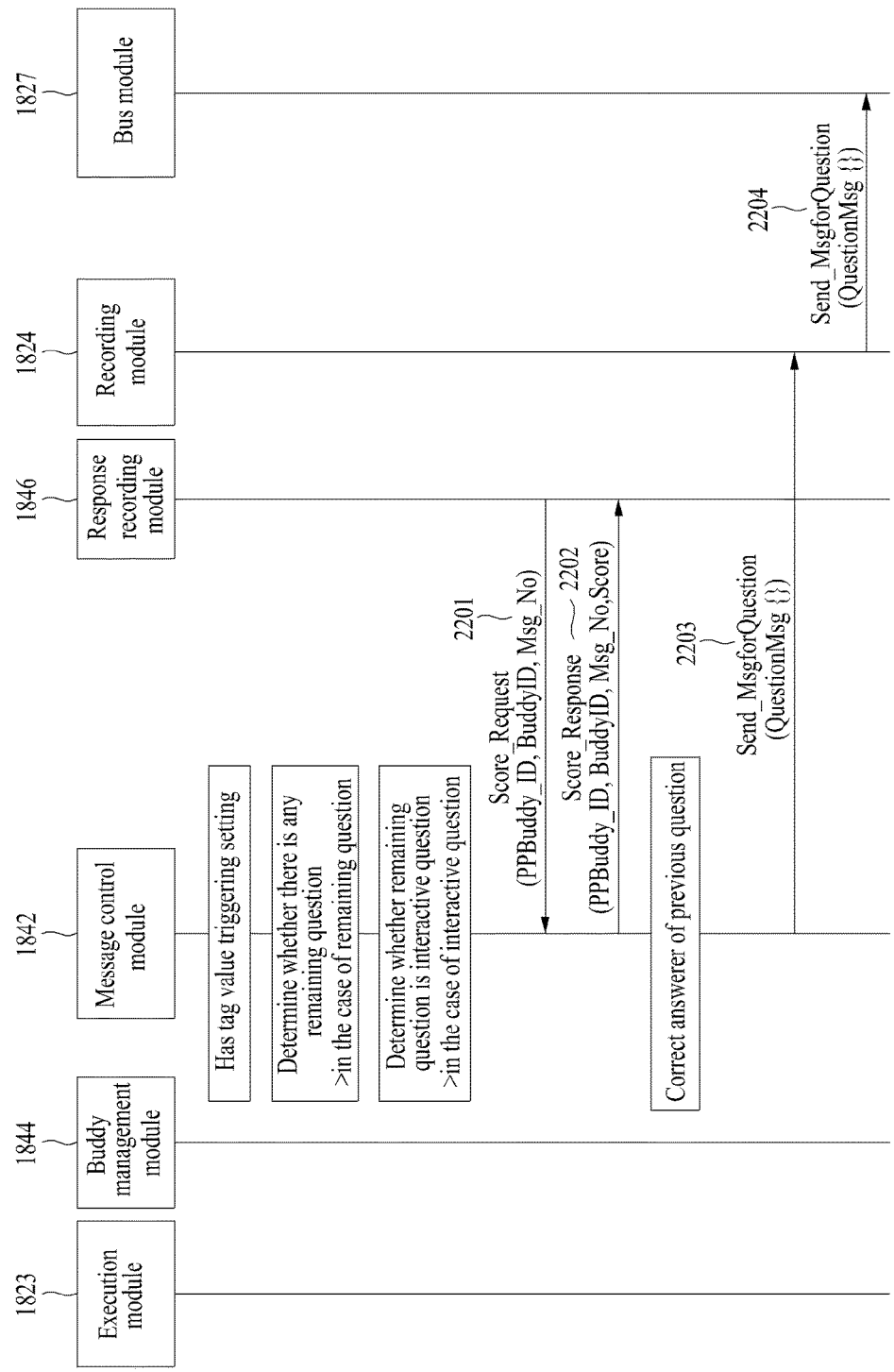

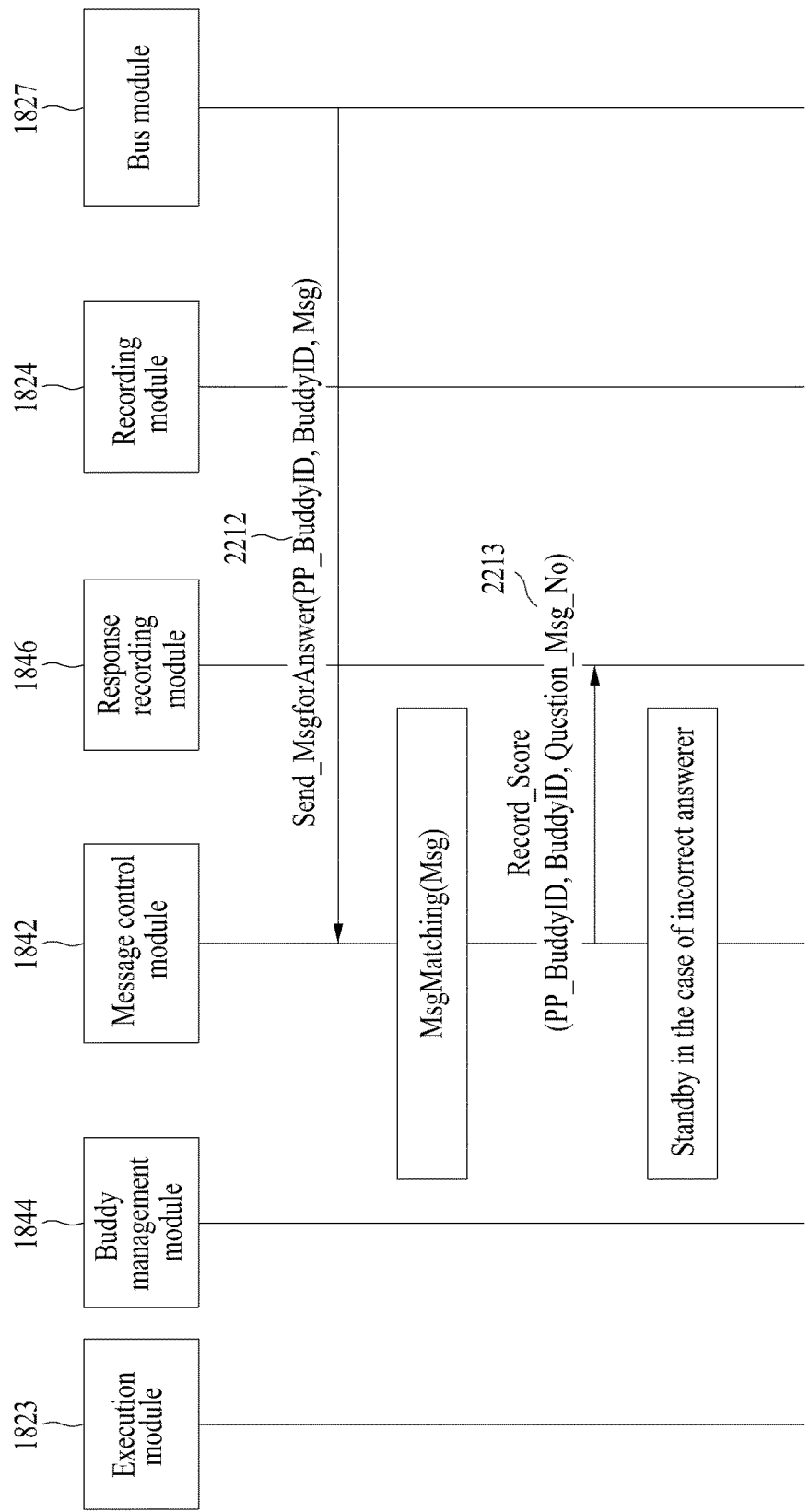

SYSTEM AND METHOD FOR PRODUCING AND EXECUTING INTERACTIVE BROADCAST PROGRAM

TECHNICAL FIELD

Embodiments of the present invention relate to a system and method for producing and executing a user participative interactive broadcast program.

RELATED ART

Not to mention of the recent fusion between broadcasting and communication, the distributions of various terminals, such as a smart television (TV), a smartphone, and an Internet protocol (IP) TV, have brought a transition from an existing uni-directional TV. environment to a bi-directional participative environment capable of interacting with users.

To trigger a user participation, an interactive broadcast service producing method according to a related art has adapted a separate individual exclusive mobile application or a short message service mobile oriented (SMS-MO) system to fit for a broadcasting environment. However, in the case of using the exclusive application, a corresponding application is to be installed for the user participation. In the case of using the SMS-MO system, a user needs to pay a communication company for separate communication expenses. Also, due to the diversification of channels allowing users to participate in a broadcast program, the existing method has some constraints in terms of expandability and instantaneity in the case of using various channels to optimize the user participation for each individual program.

Also, in the case of a program produced in series, program copyright information of each episode is managed and used in an individual document form. That is, since writers or producers (PDs) are managing information of each episode in an individual document form, the management efficiency may be degraded. In addition, issues such as duplicity or loss of a document are highly likely to arise and formatting information for each episode may be inconvenient.

Further, many current services for allowing users to participate in a broadcast program provide only a one-to-one participation. That is, a user needs to drive separate applications, independently, to participate in a program and chat with buddies during a view using a smart TV or a smartphone.

DETAILED DESCRIPTION

Technical Object

An aspect of the present invention provides a program enabler service method and system that may format information for each episode by providing an authoring tool required to produce a user participative interactive broadcast program.

An aspect of the present invention also provides a program enabler service method and system that may support an environment capable of directly executing an interactive broadcast program produced using an editor for producing the interactive broadcast program through association between the editor and various services.

An aspect of the present invention also provides a program enabler service method and system that may provide hint information by identifying users that match a predetermined condition with respect to a question given in an interactive program.

An aspect of the present invention also provides a program enabler service method and system that may provide an interactive service by employing an existing mobile instant messenger (IM) service as a user participation means to a program.

An aspect of the present invention also provides a program enabler service method and system that may provide an interactive broadcast program allowing a user participation using a buddy setting of a mobile IM.

An aspect of the present invention also provides a program enabler service method and system that may concurrently provide a broadcast participating function and a buddy chatting function through a group chatting room of a mobile IM to enable the seamless progress of a participation in a broadcast and conversation with buddies.

Solutions

According to an embodiment of the present invention, a program enabler service system for providing an interactive service for allowing a user to participate in a broadcast program may include a program creator configured to provide a tool for receiving information associated with the broadcast program, and to create the information received through the tool in a script format for the broadcast program; a program executor configured to read the information created in the script format in interaction with the broadcast program, and to provide the information to a user participating in the broadcast program through a communication channel provided from a service enabler; and a service connector configured to connect a communication service platform of the service enabler and the program executor.

According to an embodiment of the present invention, a program enabler service system for providing an interactive service for allowing a user to participate in a broadcast program may include a program creator configured to provide a tool for receiving information associated with the broadcast program, and to create the information received through the tool in a script format for the broadcast program; a mobile instant manager (IM) enabler configured to provide a communication channel with a user participating in the broadcast program; a program executor configured to read the information created in the script format in interaction with the broadcast program, and to provide the information to the user through the mobile IM enabler; and a service connector configured to connect a communication service platform of the mobile IM enabler and the program executor.

According to an embodiment of the present invention, a program enabler service method for providing an interactive service for allowing a user to participate in a broadcast program may include receiving information associated with the broadcast program, and creating the information in a script format for the broadcast program; and reading the information created in the script format in interaction with the broadcast program, and providing the information to a user participating in the broadcast program through a communication channel provided from a service enabler.

According to an embodiment of the present invention, a program enabler service method for providing an interactive service for allowing a user to participate in a broadcast program may include receiving information associated with the broadcast program, and creating the information in a script format for the broadcast program; opening a chatting room about the broadcast program through a buddy setting with a user that is to participate in the broadcast program using a mobile IM enabler; and reading the information created in the script format in interaction with the broadcast program, and providing the information to the user through the chatting room.

According to an embodiment of the present invention, a program enabler service method for providing an interactive service for allowing a user to participate in a broadcast program may include receiving information associated with the broadcast program, and creating the information in a script format for the broadcast program; opening a chatting room in which at least two users are capable of participating based on a group unit with respect to the broadcast program using a mobile IM enabler; and reading the information created in the script format in interaction with the broadcast program, and providing the information to a user participating in a corresponding group through the chatting room.

Effects of the Invention

According to embodiments of the present invention, there is provided a system in which an editor for producing an interactive broadcast program and an enabler capable of associating and thereby executing a broadcast program produced through the editor with existing communication channels are combined and thus, it is possible to format program information and thereby improve the production and management efficiency. Also, it is possible to easily and conveniently provide various communication functions required for the interactive broadcast program.

According to embodiments of the present invention, there is provided the overall monitoring function for an interactive broadcast service in a studio environment using a program enabler service system for producing and executing a program. Thus, during a program progress, a producer, in person, may verify a real-time status such as user participation information easily and conveniently in the studio environment.

According to embodiments of the present invention, a hint is provided by identifying users matching a predetermined condition with respect to a question given in an interactive program. Thus, when providing hint information through a broadcast, it is possible to prevent hint information from being exposed to all the users. Also, when giving a hint using an individual user channel, it is possible to trigger a user participation using forms applied to various business models.

According to embodiments of the present invention, by employing an existing mobile instant messenger (IM) service as a user participation means to a program, a user may participate in a program using only an existing mobile IM without a need to install a separate exclusive application. Accordingly, from perspective of a program producer, it is possible to save costs that may occur by developing and distributing, and maintaining and repairing an additional mobile application, and to easily secure existing messenger users. Further, from perspective of a mobile IM provider, it is possible to make service revenues by developing a function exclusive for an interactive program and by providing a related additional service.

According to embodiments of the present invention, a broadcast participation function and a buddy chatting function are concurrently provided to a user through a group chatting function on a mobile IM and thus, it is possible to easily meet the needs of the user without a transition between applications or between screens.

BRIEF DESCRIPTION OF DRAWINGS

FIGS. 22A through 22C are flowcharts illustrating a process of providing an interactive question through a mobile IM during a program progress according to an embodiment of the present invention.

FIGS. 26 and 27 illustrate examples to describe a method of registering a user as a participant in group chatting of a program chatting room according to an embodiment of the present invention.

FIGS. 32 and 33 illustrate examples to describe a method of processing a response to a question based on a participation order designated in a program chatting room according to an embodiment of the present invention.

BEST MODE

Hereinafter, embodiments of the present invention will be described.

An interactive broadcast service has been evolved to a level at which a participation and a response through direct interaction with individual programs are allowed, beyond a service level for simply verifying information associated with a program or news. During such a process, various types of broadcasting genres will be developed. In particular, a reference program that draws a high participation of users is to be distributed in an individual program format and grown into the global format business.

Accordingly, the present invention proposes a technology capable of providing various communication functions required for an interactive broadcast service, together with a production tool directly executable in a real broadcasting environment in order to achieve a user participative interactive broadcast service.

In the present specification, the term "broadcast program" may inclusively indicate multimedia contents produced to enable any type of interactivities, for example, a user participation such as a question (quiz), a survey, a vote, and an application, and a user record such as a bookmark and an annotation. The term "producer" may indicate a target that plans and produces an interactive broadcast program, such as a writer or a PD in broadcasting. The term "manager" may indicate a target that is in charge of a system setting and operation to provide an interactive broadcast program. Also, the term "user" or "participant" may indicate a target that directly participates in a broadcast program as a viewer viewing the broadcast program.

Embodiments of the present invention may be applied to all the systems based on a user participative interactive service, such as an e-Learning system, not to mention of a broadcast system of a TV environment.

Hereinafter, a program enabler service system and a program enabler service method for providing an interactive service of a broadcast program will be described based on an example of a broadcast program in which a question is given during a broadcast and a user participates.

Figure 1:
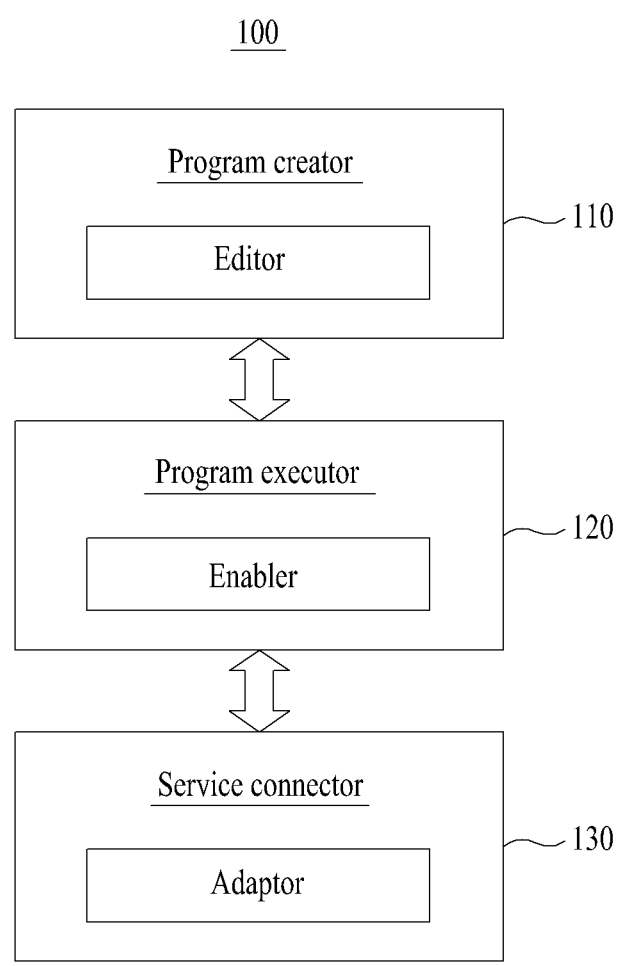
FIG. 1 is a block diagram illustrating a configuration of a program enabler service system according to an embodiment of the present invention.

FIG. 1 is a block diagram illustrating a configuration of a program enabler service system according to an embodiment of the present invention.

Referring to FIG. 1, the program enabler service system may include a program creator 110 for creating a broadcast program, a program executor 120 for executing the broadcast program created by the program creator 110, and a service connector 130 for connecting a communication service for interacting with the broadcast program executed by the program executor 120.

As a system available by a producer at the planning stage to produce a broadcast program, the program creator 110 may support a tool (iFormat editor) of providing a production function of designing and scripting parts allowing a user participation in the broadcast program using a predefined enabler and a visual tool, and directly executing the scripted parts in a real broadcasting environment. In the present embodiment, as a program authoring tool required at the stage of producing the broadcast program, a function capable of inputting basic information required for the broadcast program, a function capable of selecting a broadcast participation channel by adding various service enablers, and a function capable of easily editing information for each episode of the broadcast program, converting the information to a script format, and launching the converted information in a real broadcasting environment may be provided.

As an enabler system for executing the broadcast program, the program executor 120 may read broadcast program information produced using the tool, may provide an interactive participation means required for the corresponding broadcast program in association with various communication channels such as various legacy systems and/or social services, may provide statistical information of the corresponding broadcast program, and may support a function such as a monitoring tool and a user response management for progress of the broadcast program.

The service connector 130 may support an adaptor function capable of easily and conveniently associating various communication channels with the broadcast program. In the present embodiment, various communication functions required to service a broadcast program may be provided as a technology for easy and convenient interaction between various communication channels and the broadcast program.

Figure 2:
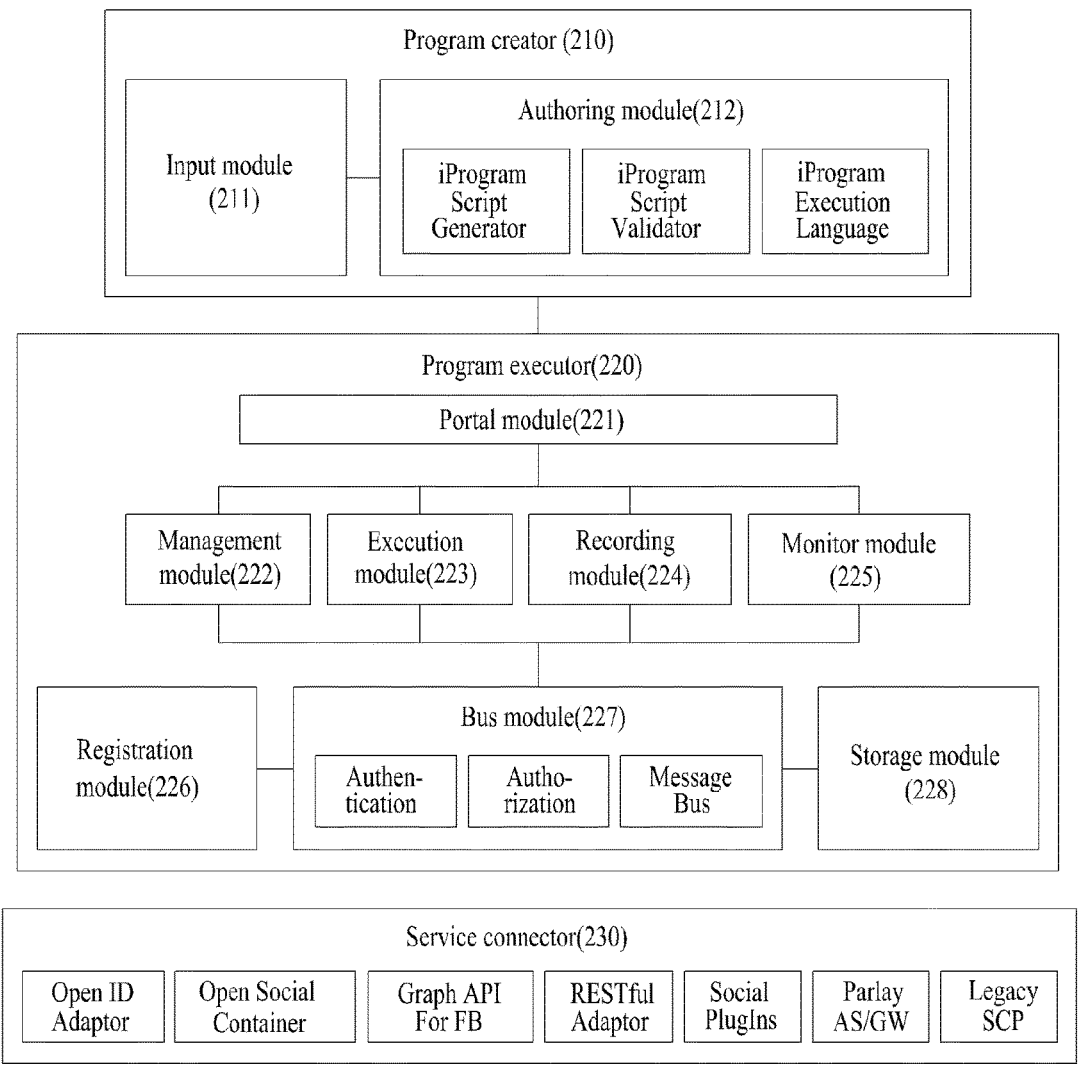
FIG. 2 is a block illustrating a configuration of a program enabler service system for producing and executing a user participating broadcast program according to an embodiment of the present invention.

Hereinafter, a program creator 210, a program executor 220, and a service connector 230 will be described with reference to FIG. 2.

The program creator 210 is configured to provide an environment (iProgram Creation Environment) for authoring a broadcast program and may include an input module (iFormat Editor) 211 and an authoring module (iProgram Designer) 212.

The input module 221, as a tool used by a writer or a PD in broadcasting to plan an interactive program, may indicate a tool for registering/correcting/deleting a program information input and participation method, a question, and the like.

The authoring module 212 may author the broadcast program in a format executable in the program executor 220 by scripting data input to the input module 211 through various types of modules (iProgram Script creator, iProgram Script Validator, iProgram Execution Language) for scripting the broadcast program.

FIGS. 3 through 13 illustrate editor screens provided from the input module 211.

Figure 3:
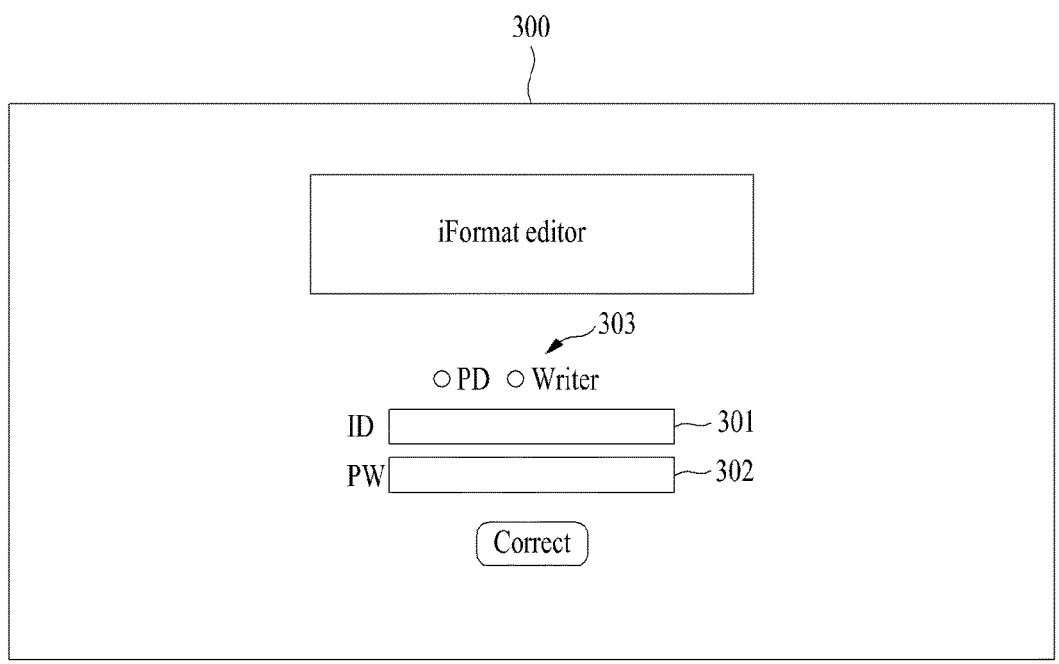
FIGS. 3 through 13 illustrate examples of an editor screen for producing a broadcast program according to an embodiment of the present invention.

Referring to FIG. 3, the input module 211 may provide a log-in screen 300 for allowing an access of a producer having a right to input and correct information of a broadcast program. In this instance, the log-in screen 300 is configured to receive an identifier (ID) 301 and a password (PW) 302. When an editor right is different for each type of producer such as a PD and a writer in broadcasting, the log-in screen 300 may receive an ID/PW together with a producer type 303.

Figure 4:
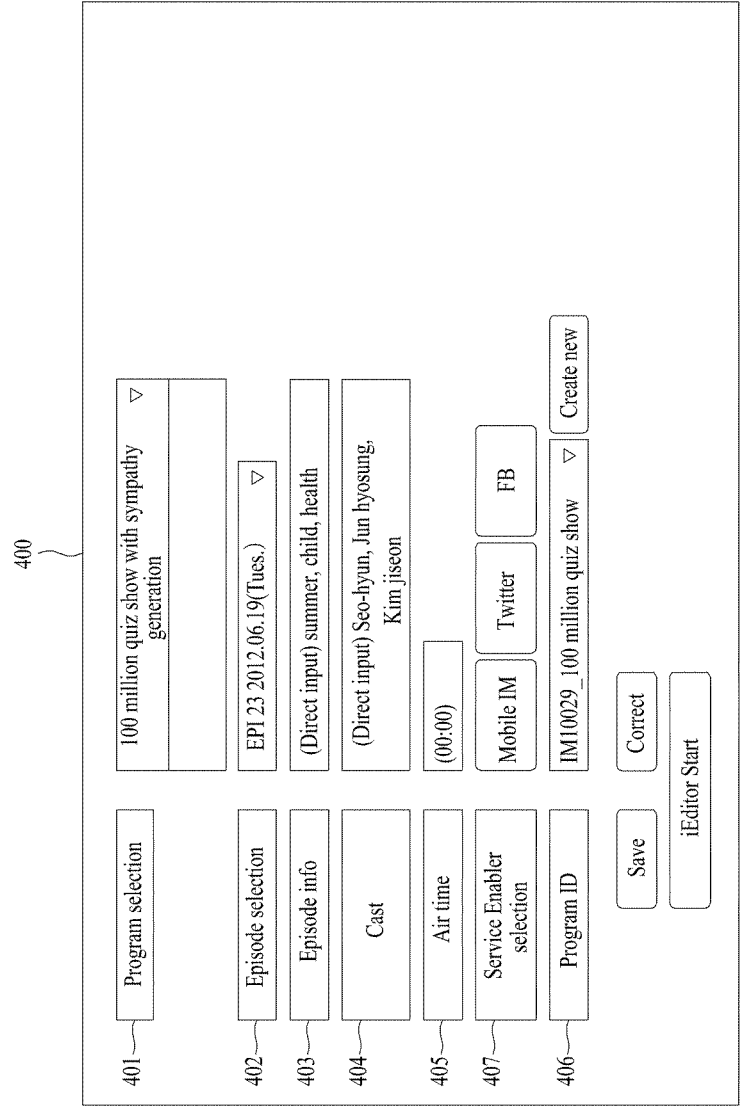

Referring to FIG. 4, the input module 211 may provide an editor start screen 400 to a producer connected through a log-in procedure. The producer may select or input a program 401 and an episode 402 that are to be authored through the editor start screen 400. In addition, the producer may input episode information (comment) 403, cast information 404, an air time 405, and a program ID 406. Further, for communication with a user, a service enabler 407, such as a mobile instant messenger (IM), Twitter, and Facebook, which is to interact with the broadcast program, may be selected on the editor start screen 400. Here, the program ID 406 is an ID of a program manager. For example, when a mobile IM is used as a communication channel with a user, the program manager needs to be regarded as a single buddy ID. A buddy ID for a corresponding program needs to be created for a question and an answer through the mobile IM. The editor start screen 400 may be configured using a direct input method of a producer and a selection method from a predetermined item.

Figure 5:
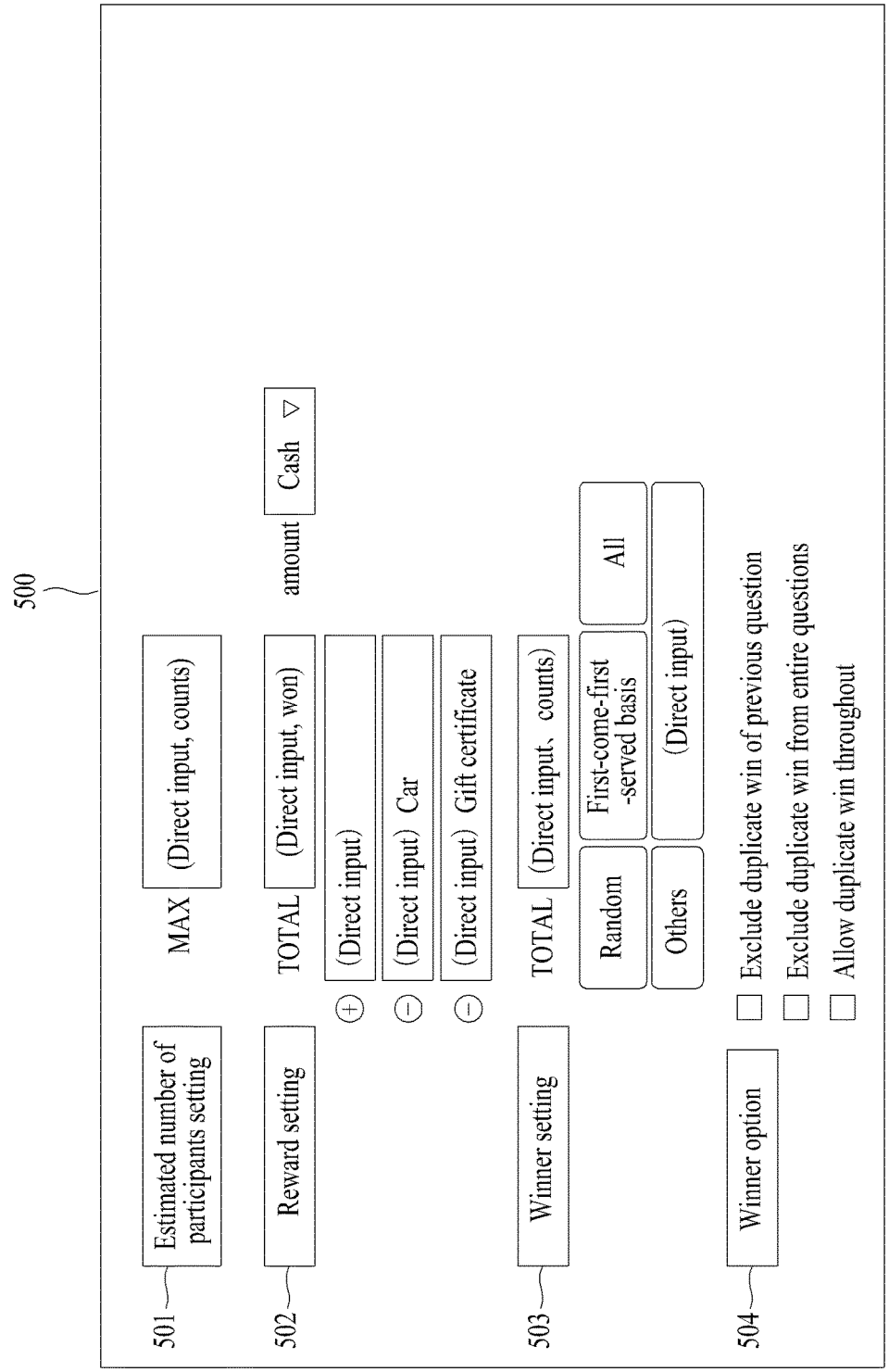

Referring to FIG. 5, the input module 211 may provide an initial setting screen 500 for inputting basic information required for the broadcast program. The estimated number of participants 501 in the broadcast program, a reward (for example, money and gifts) 502, a winner (the number of persons or conditions) 503, and other options associated with a winner 504 may be set on the initial setting screen 500. The initial setting screen 500 may be configured using a direct input method of a producer and a selection method from a predetermined item.

Figure 6:
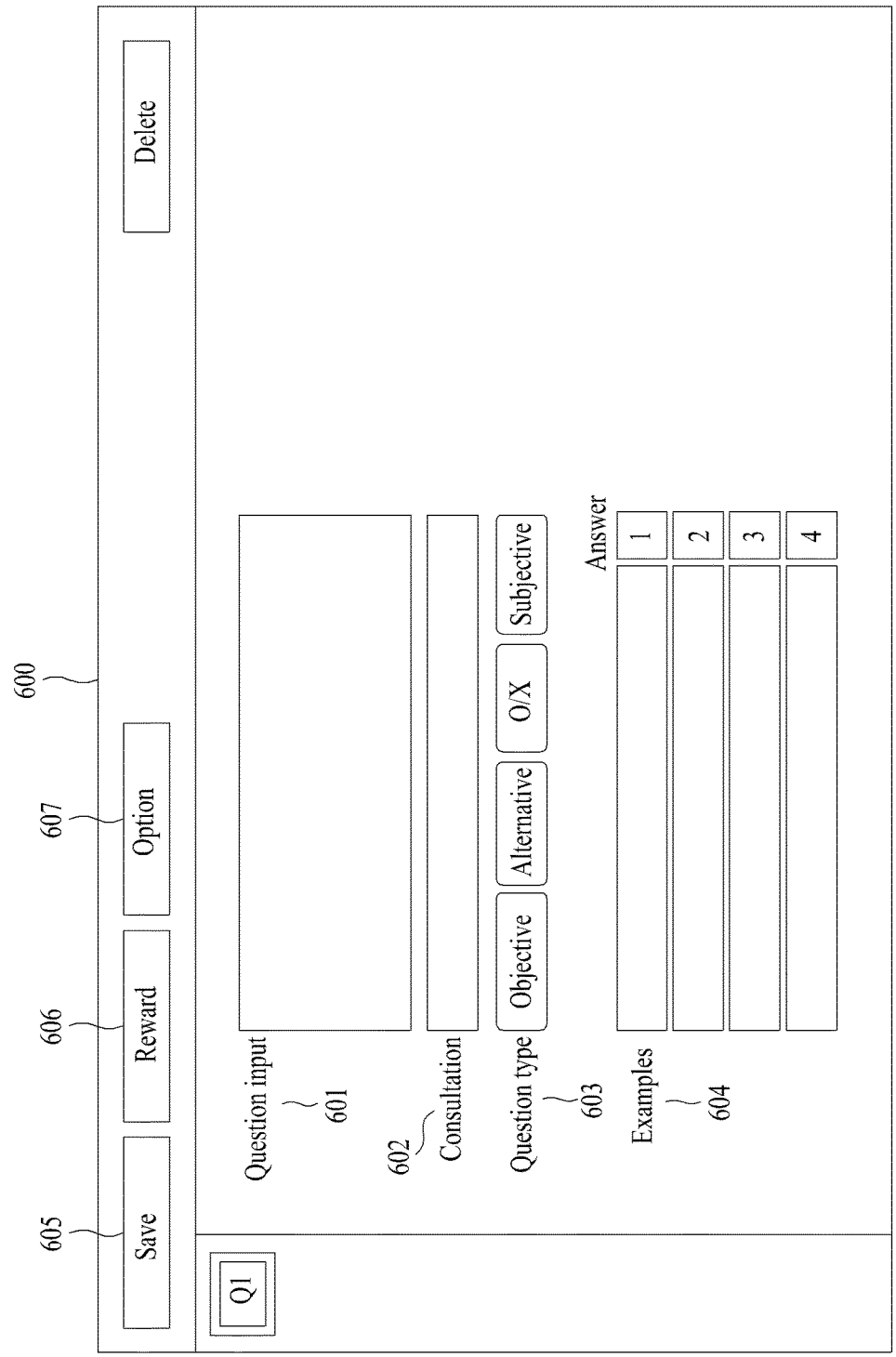

Referring to FIG. 6, the input module 211 may provide a question screen 600 for inputting a question during a broadcast. Here, the question screen 600 may include contents 601 of a question, a consultation 602 associated with the question, a type 603 of the question, and examples 604 of a multiple-choice question. Also, the question screen 600 may include a "save" menu 605 for storing a question input by a producer, a "reward" menu 606 for setting a reward for the question, and an "option" menu 607 for setting an option associated with the question.

Figure 7:
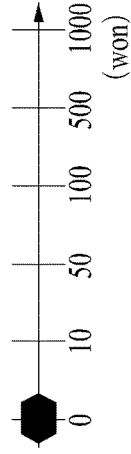

FIG. 7 illustrates a reward setting screen 700 displayed in response to the "reward" menu 606 on the question screen 600. A producer may set a reward to be provided to a correct answerer through the reward setting screen 700. In this instance, the reward may be individually set for each question.

Figure 8:
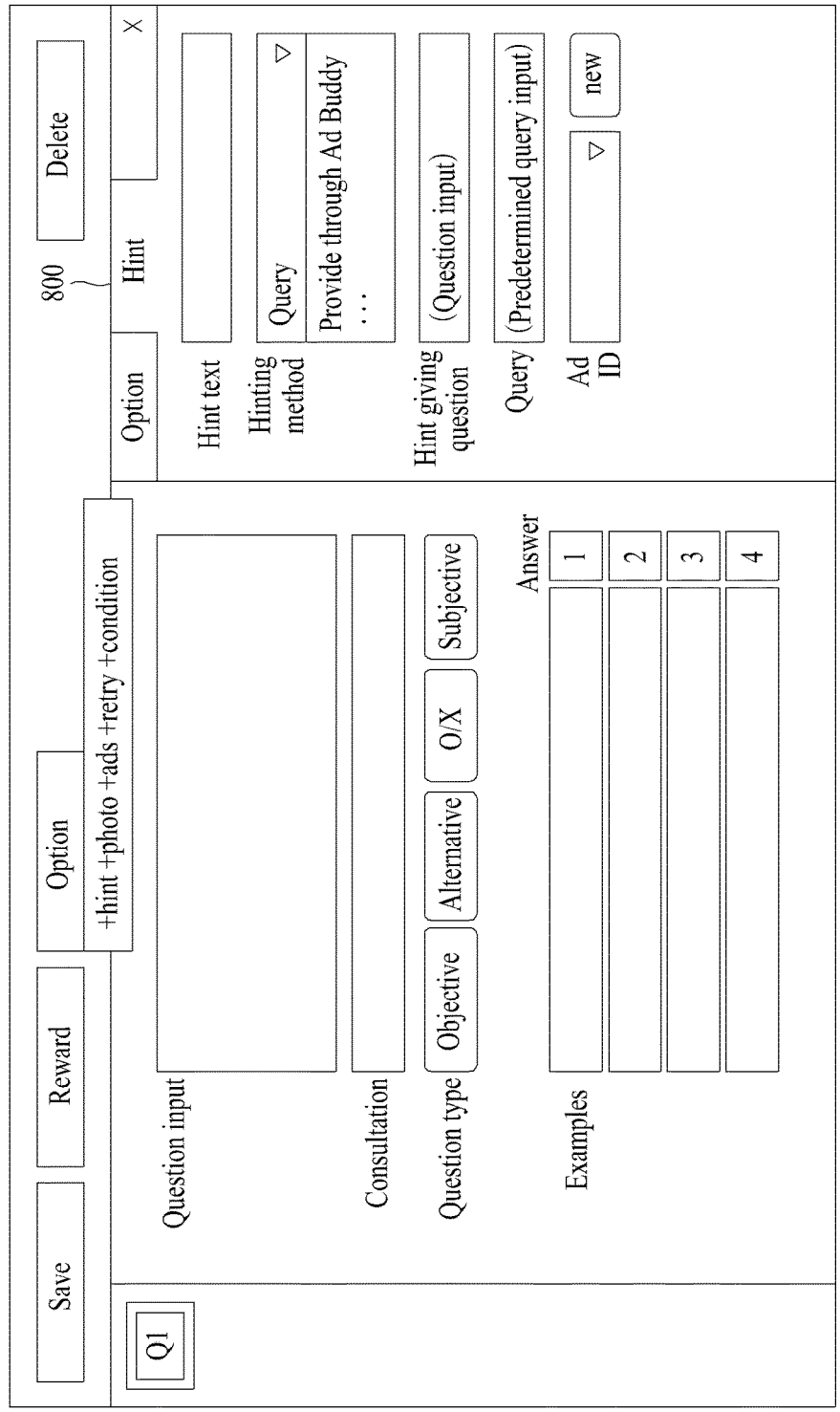
Figure 9:
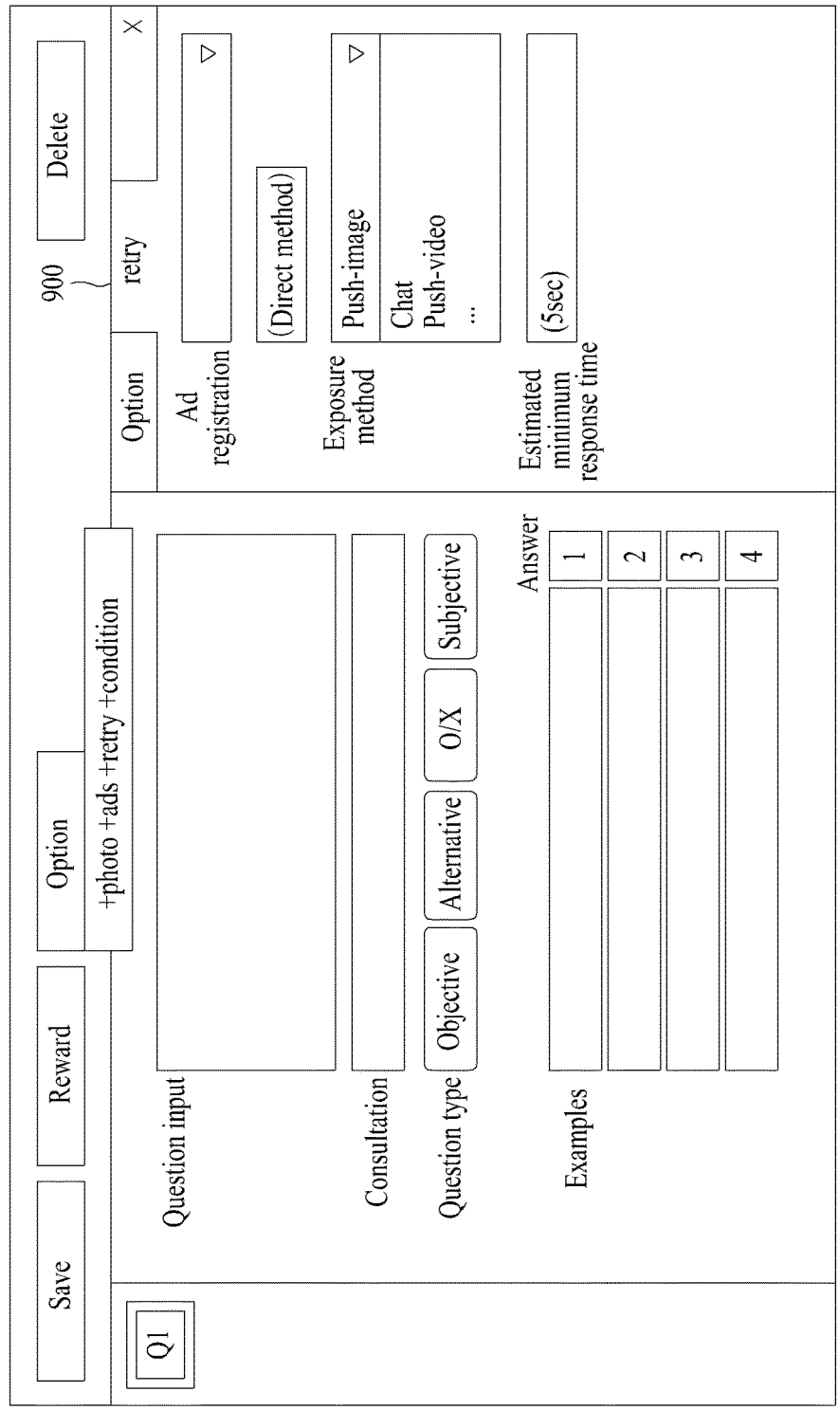

FIG. 8 illustrates an option setting screen 800 displayed in response to the "option" menu 607. A producer may individually register various options, such as a photo (still image, a video, etc.), advertisements (ads), and a condition in association with each question, through the option setting screen 800. Also, the option setting screen 800 may provide a function of giving a hint to participants matching a predetermined condition and a function of setting whether a retry opportunity is available, as an individual question option. Referring to FIG. 8, the producer may set a hint to be given to participants by setting a hint text, a target to receive a hint, a hinting method, and a hint query. A method of selecting a target to receive a hint may use a method designated by a program producer among a variety of methods such as a method of responding to a predetermined query, a method of responding to a predetermined advertisement, a method of responding to predetermined content (video or a voice file), a method using a location matching condition (for example, a user located at a predetermined location and a user having checked in at a predetermined location). Also, when the target to receive a hint is determined, a method of giving a hint may use a method of giving a hint to the corresponding target in an attached file format or a message format through a mobile IM. Referring to FIG. 9, the producer may set a retry opportunity to be assigned to a participant having made an answer corresponding to a predetermined condition by setting a means (for example, an advertisement) for assigning a retry opportunity, a method of displaying the means, and a response time to the means.

Figure 10:
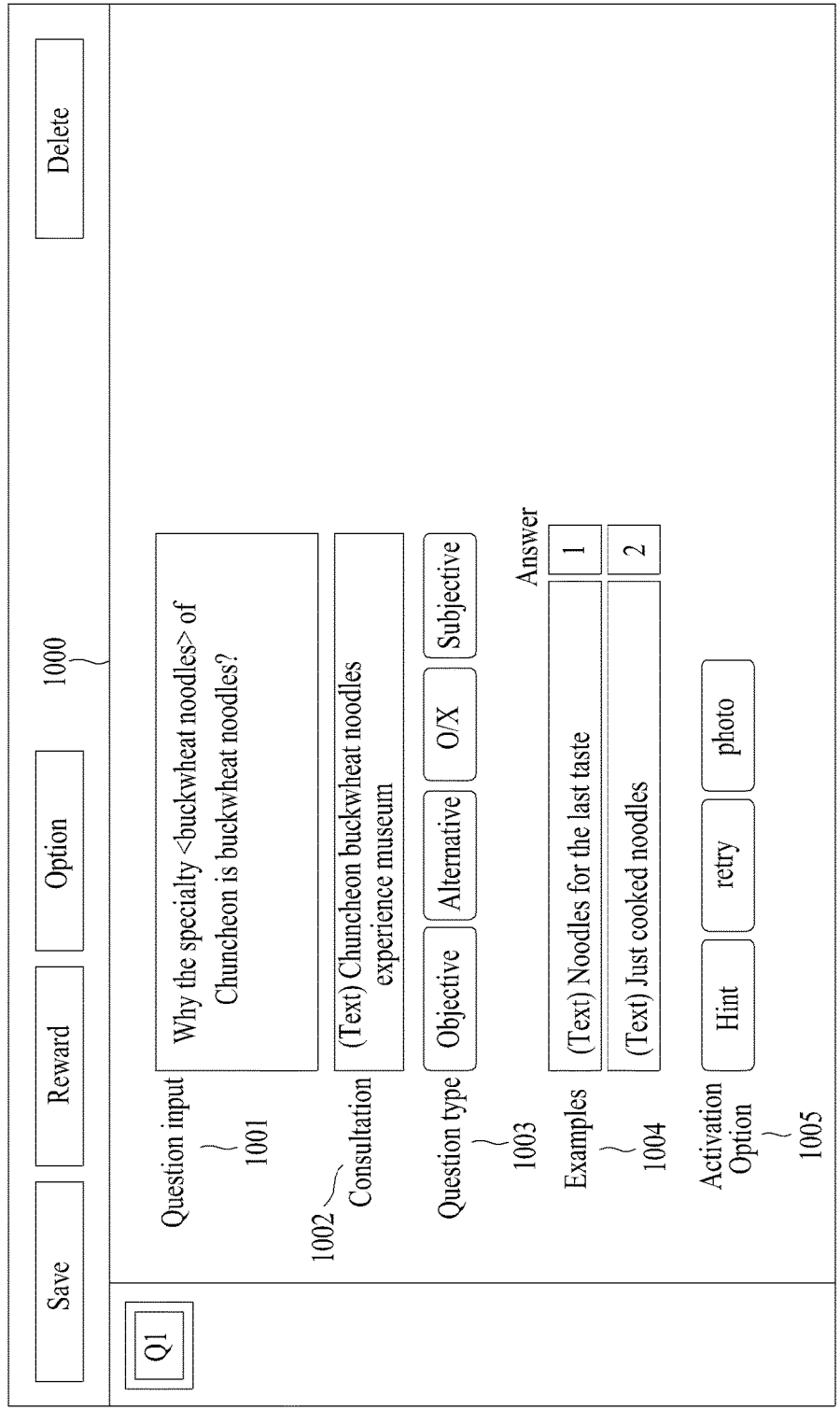

FIG. 10 illustrates an example of a question screen 1000 input by a producer. Referring to FIG. 10, "why the specialty <buckwheat noodles> of Chuncheon is buckwheat noodles" in contents of a question 1001, "Chuncheon buckwheat noodles experience museum" as a consultation 1002 thereto, an "alternative" type as a question type 1003, and two examples as examples of the alternative 1004 may be displayed on the question screen 100 based on an input and settings of the producer. In addition, an option status 1005 of a question set by the producer may also be displayed on the question screen 1000 based on a setting of the producer.

Questions to be given in a broadcast program through editor screens described with reference to FIGS. 3 through 10 may be individually created. In this instance, a list of questions created by the producer may be sequentially aligned and thereby displayed on one side of a question screen.

Figure 11:
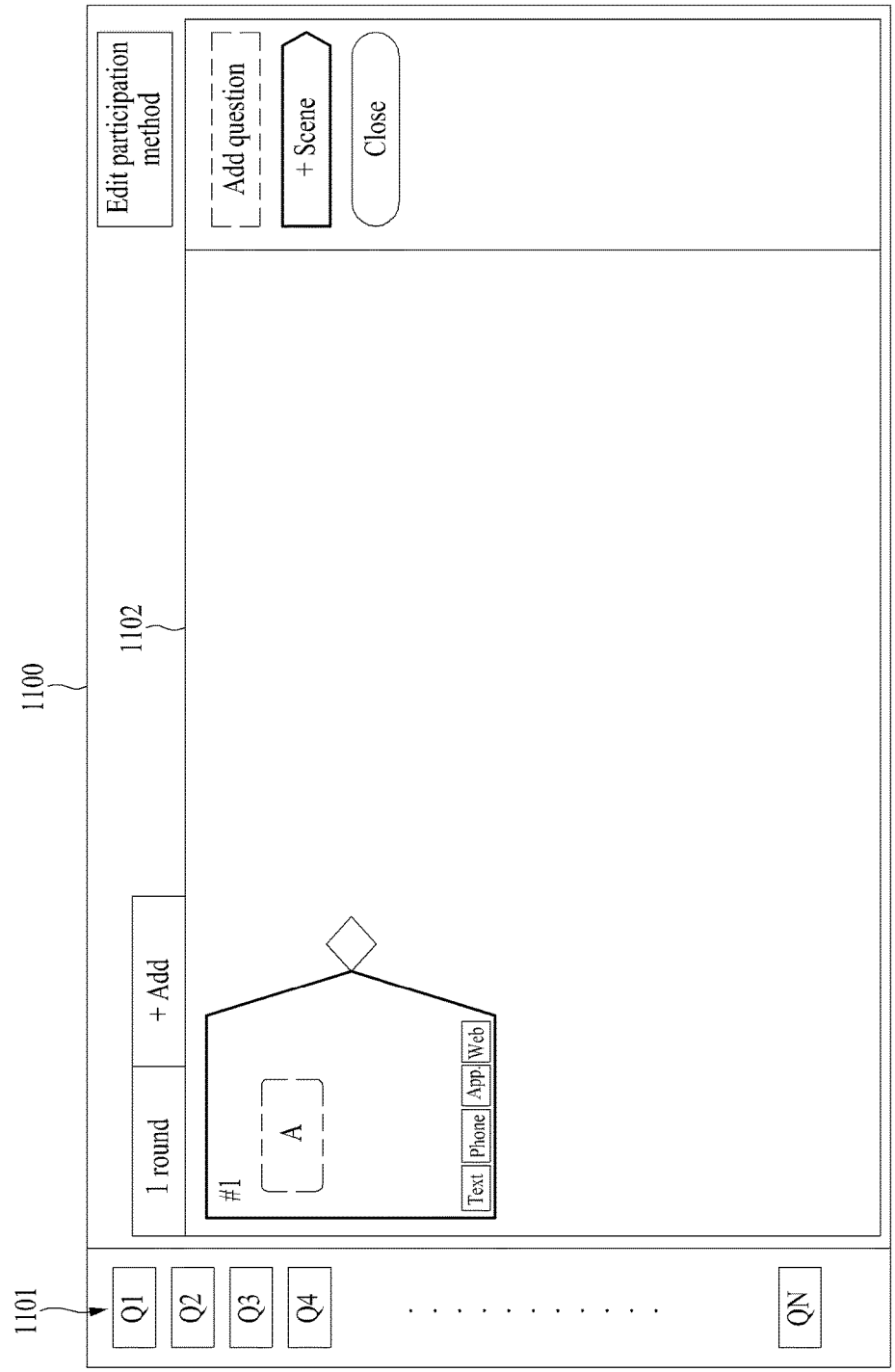
Figure 12:
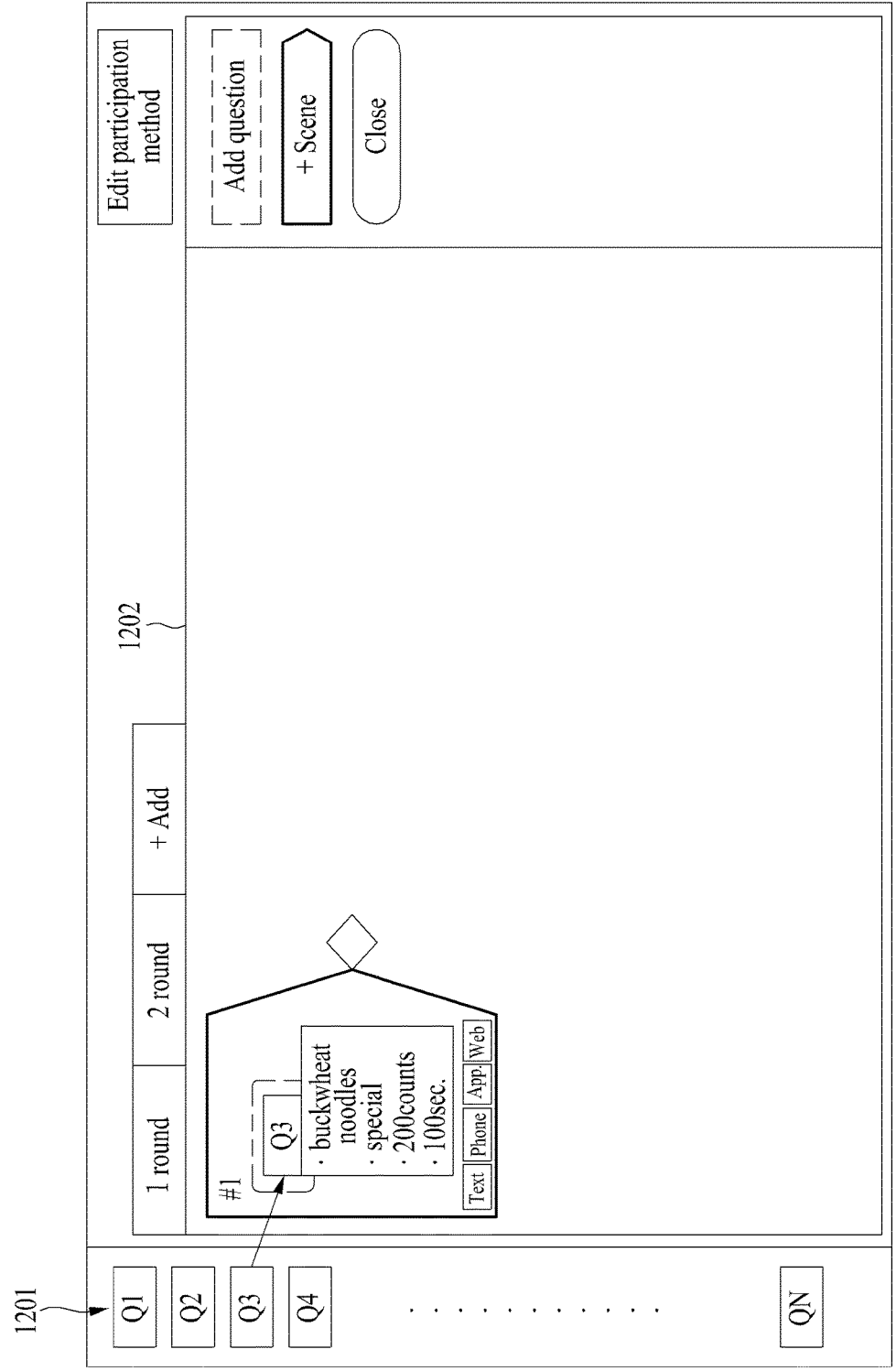

Referring to FIG. 11, when creation and setting of questions to be given for a predetermined episode of a broadcast program are completed, the input module 211 may provide a process creation screen 1100 for setting a question solving process. In this instance, the process creation screen 1100 may also provide a list 1101 of questions created by a producer and a screen 1102 for adding a question to a list for each round. For example, referring to FIG. 12, the producer may selectively set a question to be given for each round by selecting a question to add to each round from a list 1201 of questions and dragging the selected question to a question addition screen 1202.

Figure 13:
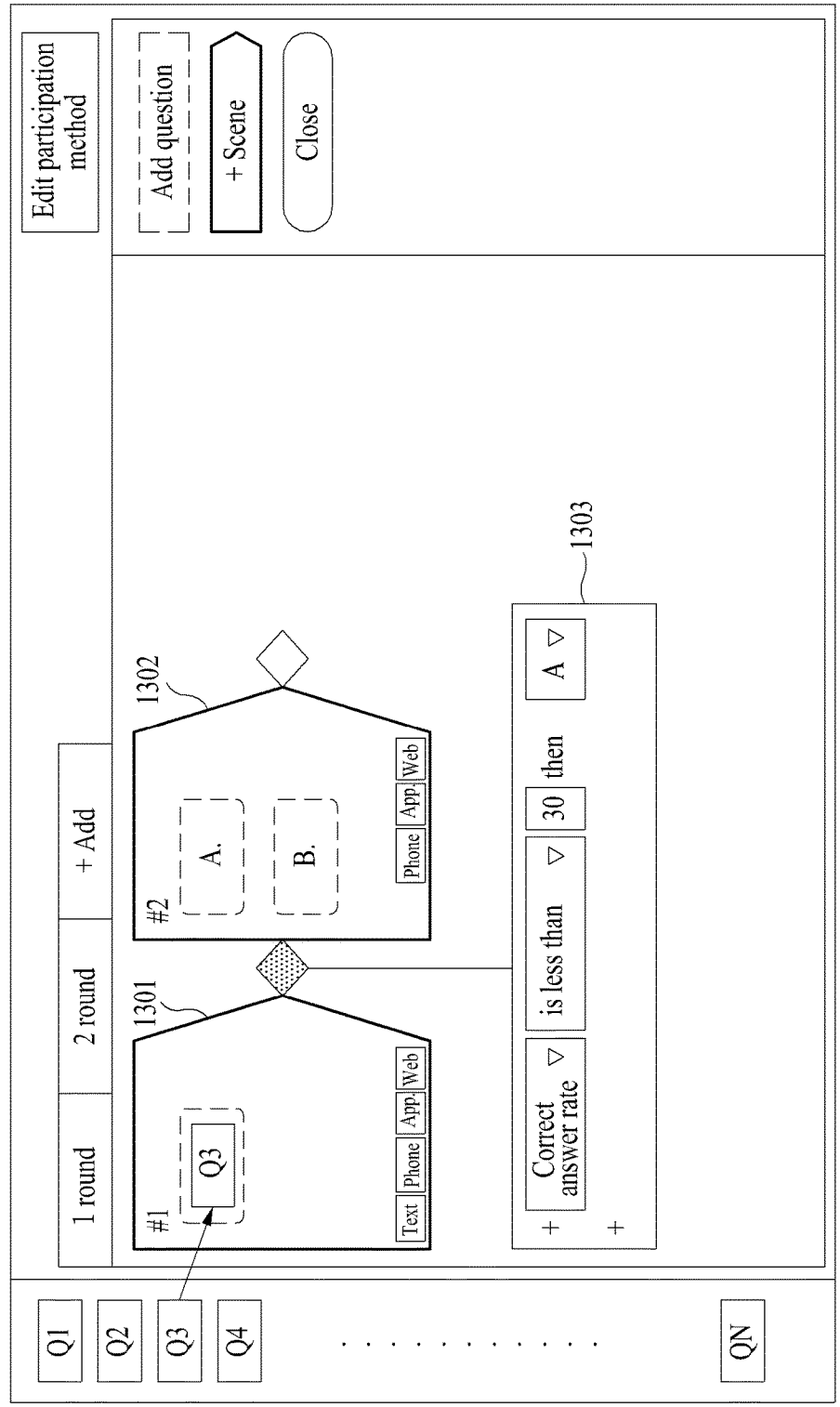

Further, the process creation screen 1100 may provide a function of adding two or more questions as a question to be given at one round and a function of setting detailed conditions for connection between questions. That is, two or more questions of different conditions based on a previously given question may be set as subsequent questions to be given (interactive question). Referring to FIG. 13, in an example in which questions A and B are set as a question 1302 to be subsequently given after a first question 1301 is given at a first round, a condition 1303 may also be set that if a correct answer rate of a first question is 30% or less, the question A is given as a subsequent question, and if the correct answer rate of the first question exceeds 30%, the question B is given as the subsequent question.

According to the above configuration, the input module 211 may provide a function of inputting basic information (episode number, broadcast start/end time) of a broadcast program and a function of selecting a service enabler to interact with the broadcast program through the aforementioned editor screen, and may also provide the overall function of inputting an interactive object (for example, a quiz, a survey, an application, and a vote) allowing a user to participate in the broadcast program and creating a participation process for the corresponding interactive object.

Referring again to FIG. 2, the program executor 220 serves to provide an environment (iProgram Runtime Environment) for executing a broadcast program authored by the producer. Referring to FIG. 2, the program executor 220 may include a portal module (iProgram Studio Portal) 221, a management module (iProgram Lifecycle Manager) 222, an execution engine (iProgram Execution Engine) 223, a recording module (iProgram Logger) 224, a monitor module (iProgram Monitor) 225, a registration module (iProgram UDDI Repository) 226, a bus module (iProgram Bus) 227, and a storage module (iProgram Database) 228.

The portal module 221, as a web-based portal system for using an enabler system, indicates a system accessible by registering a user ID at the event of launching an individual service enabler and basically used by a program manager. The portal module 221, as a service enabler for communication with a user, may interact with a mobile IM, Twitter, and Facebook.

The management module 222 may provide a function of managing a service lifecycle of an individual service enabler and a function of launching and closing a service to fit for a broadcasting environment in interaction with the broadcast program.

The execution engine 223, as an engine for executing an interactive service, may indicate an engine that provides the interactivity of the broadcast program through combination with program information provided in a script format and a service in an enabler type.

The recording module 224 may provide a function of recording various events of an interactive service enabler interacting with the broadcast program.

The monitor module 225 may provide a function of monitoring an operation status of the interactive service enabler interacting with the broadcast program.

The registration module 226 may provide a function of registering and managing information of the interactive service enabler interacting with the broadcast program and service adaptor information of the corresponding enabler.

The bus module 227 may provide a message transfer function (message bus) through the interactive service enabler interacting with the broadcast program and an authentication (authorization) function for a message.

The storage module 228 may provide a function of storing and maintaining the overall information required for an interactive service of the broadcast program.

The service connector 230 may provide an adaptor function for connecting various communication channels for the interactive service of the broadcast program. For example, an open ID adaptor, an open social container, a graph API for facebook, a RESTful adaptor, a social plug-in system (PlugIns), a parlay AS/GW, and a legacy SCP may be applicable to connect a user communication channel.

In the present embodiment constructed as above, it is possible to provide an environment for authoring a broadcast program by formatting program information for each episode and an environment for executing various communication functions and a broadcast program in interaction with an interactive service enabler.

In the present embodiment, it is possible to provide a monitoring function for an interactive broadcast service in a studio environment using the program enabler service system 200 constructed as above. The monitor module 225 may provide a function of verifying spontaneous viewer participation information and a function of providing program progress information of a master of ceremonies (MC) in a live broadcasting environment, in a separate UI form. For example, the monitor module 225 may provide a function of providing current participant information, a participation status for each region, a participation status for each age, a participation status for each sex, participant statistical information for each question, and an individual participant status and a function of supporting a connection (text or a call) with a viewer during a program progress.

FIGS. 14 through 17 illustrate user interface (UI) screens provided from the monitor module 225.

Figure 14:
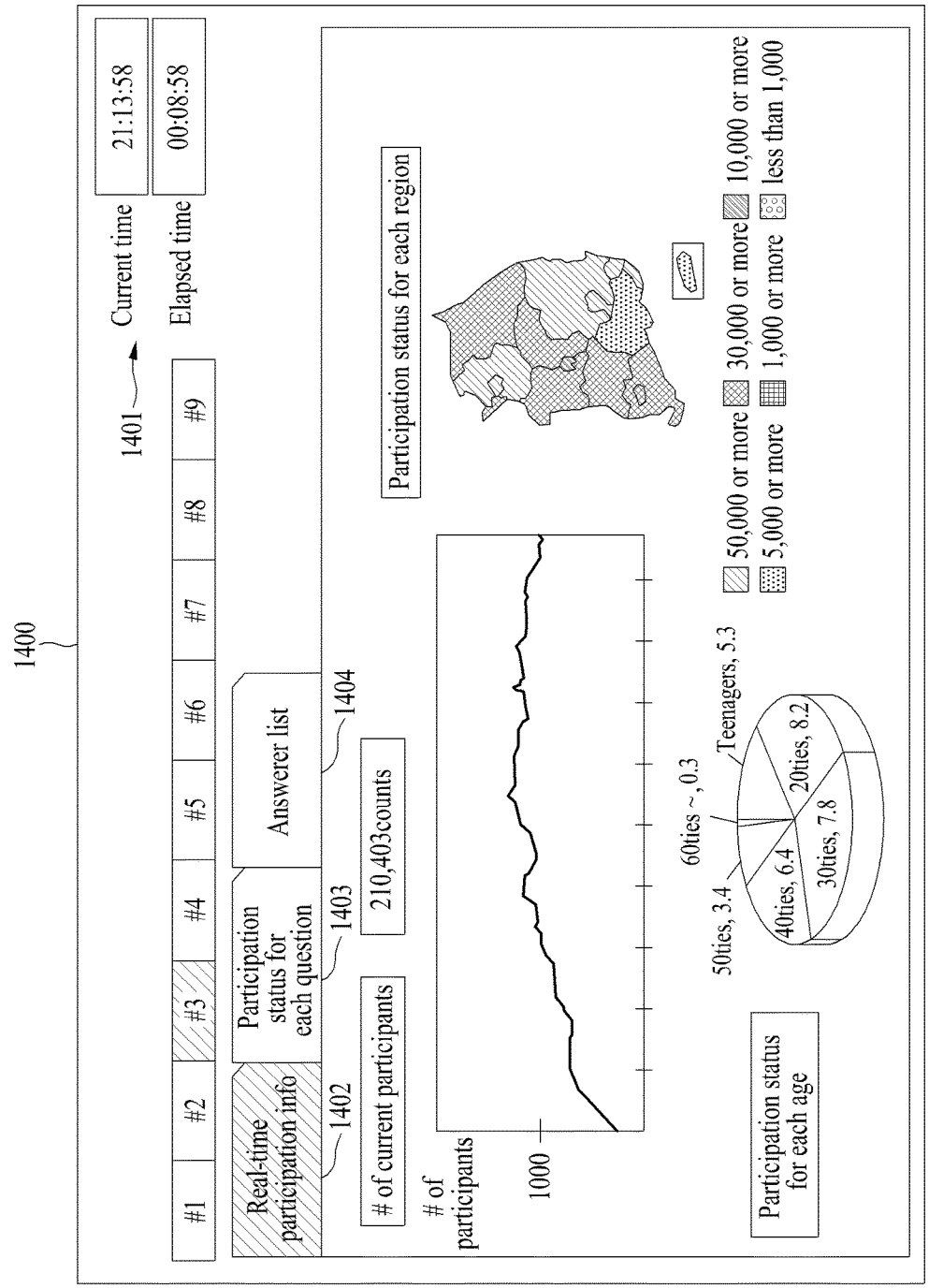
FIGS. 14 through 17 illustrate examples of a monitoring screen for an interactive service of a broadcast program according to an embodiment of the present invention.
Figure 15:
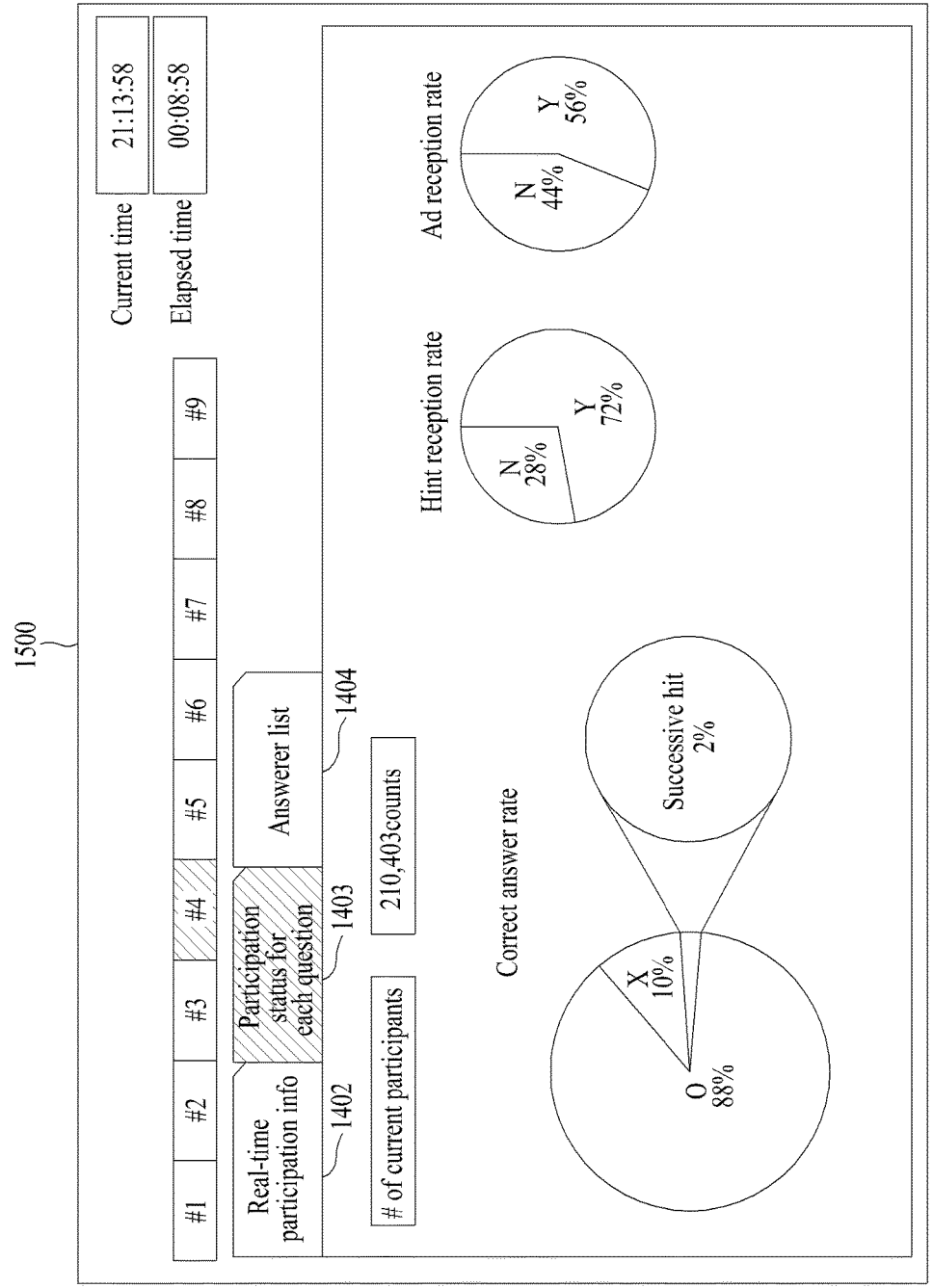
Figure 16:
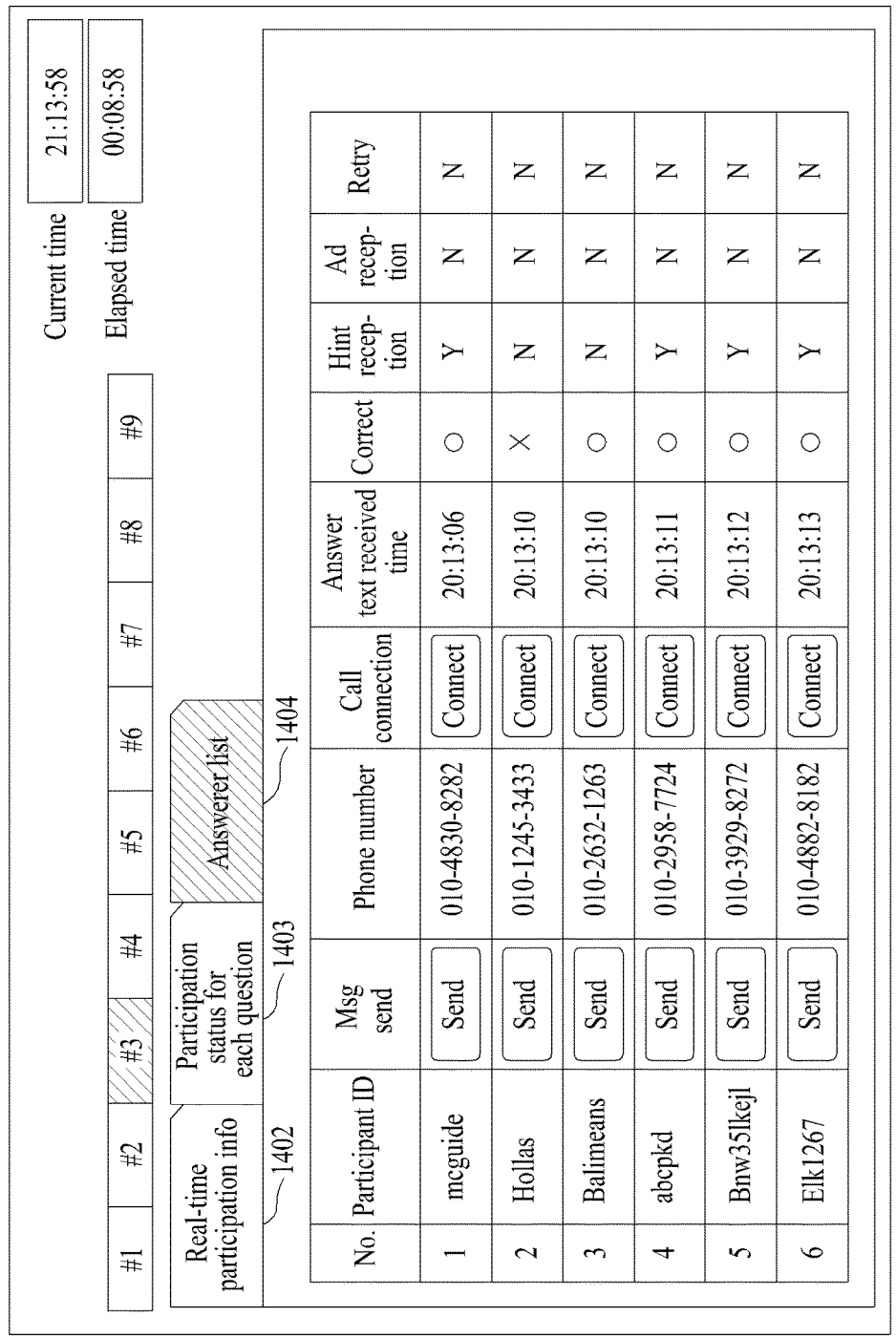

Referring to FIG. 14, the monitor module 225 may provide a manager monitor screen 1400 in response to a request of a producer or a manager. The manager monitor screen 1400 may provide program related time information 1401 (for example, a current time, an elapsed time, etc.), a "real-time participation information" tap 1402, a "participation status for each question" tap 1403, and an "answerer list" tap 1404. Here, referring to FIG. 14, the "real-time participation information" tap 1402 may provide the number of current participants collected in real time, a participation status for each region, a participation status for each age, and a participation status for each sex. Also, referring to FIG. 15, the "participation status for each question" tap 1403 may provide a correct answer rate, a hint reception rate, an ad reception rate, and a retry rate for each question. Referring to FIG. 16, the "answerer list" tap 1404 may provide a participant ID, a phone number, a time at which an answer text is received, whether the answer is correct, whether a hint is received, whether an ad is received, and whether a retry challenge is available, and may also provide a related UI such as a message sending function through a participant ID and a call connecting function through a phone number.

Figure 17:
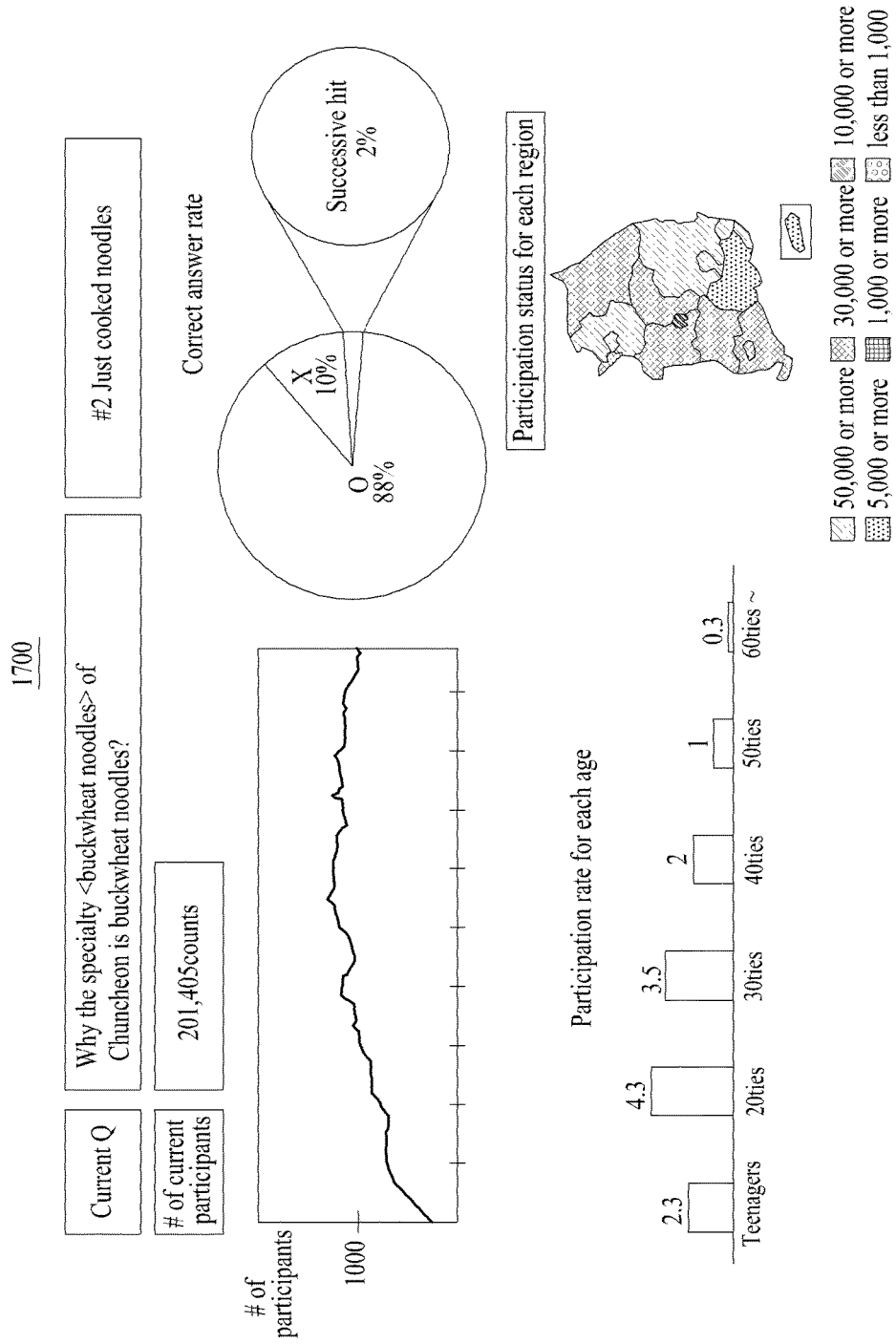

Referring to FIG. 17, the monitor module 225 may provide a host monitor screen 1700 for a program host, for example, an MC. The host monitor screen 1700 is designed to provide information required for a program progress, and may provide a currently given question, a consultation, a question type, an example, correct answer information, the real number of participants, a correct answer rate, a participation rate for each age, and a participation status for each region.

Through the aforementioned UI screens associated with a monitor function, a manager and a host may easily verify a real-time participation status of a program or the overall information required for the program progress in person in a studio environment.

Figure 18:
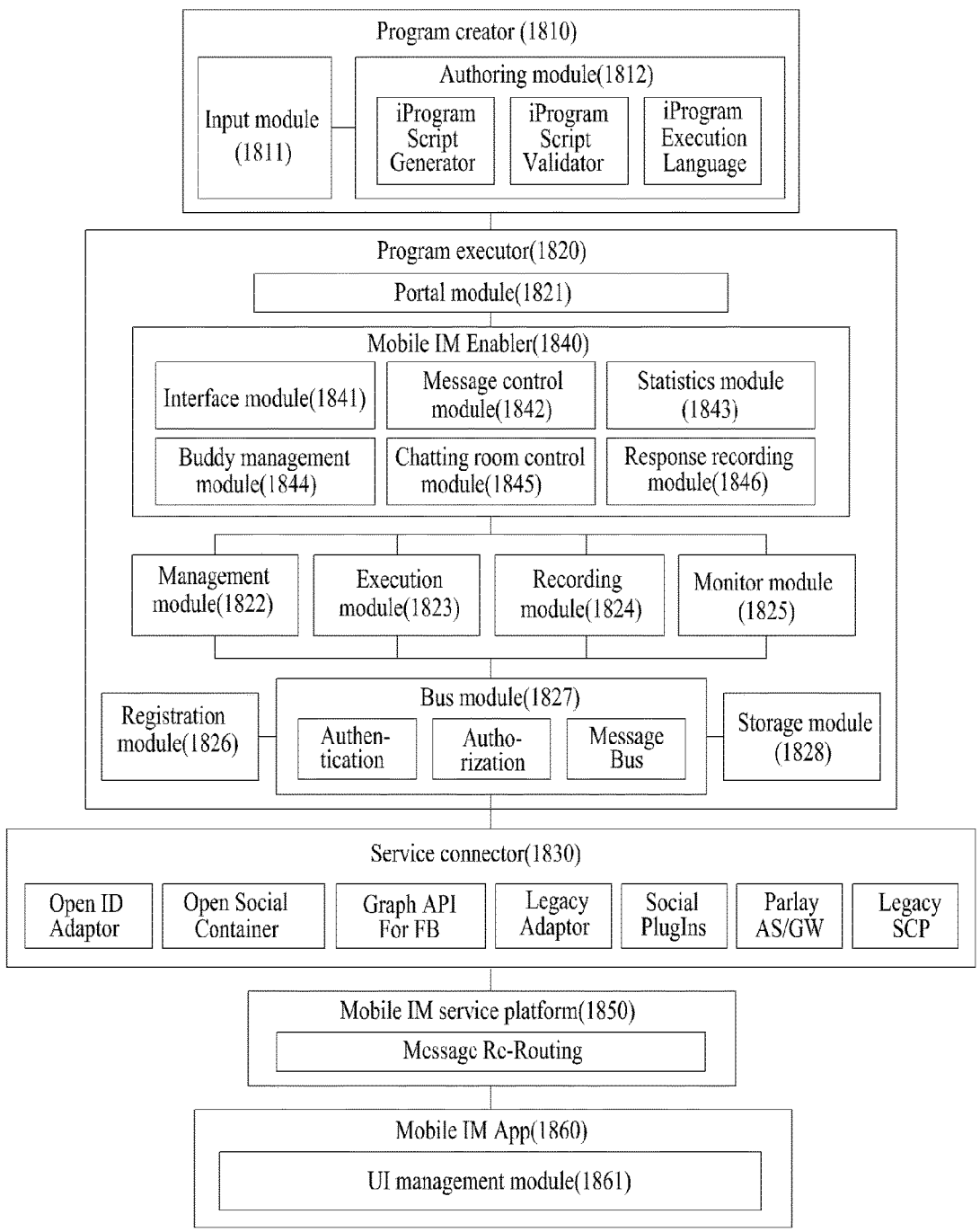
FIG. 18 is a block diagram illustrating a configuration of a program enabler service system in which a mobile instant messenger (IM) enabler is included as an interactive service enabler according to an embodiment of the present invention.

FIG. 18 illustrates a configuration of a program enabler service system including a mobile IM enabler 1840 as an example of an interactive service enabler. A description related to constituent elements described above with reference to FIG. 2 among constituent elements of the program enabler service system of FIG. 18 will be omitted.

Referring to FIG. 18, a service connector 1830 may connect to a mobile IM service platform 1850 through a legacy adaptor. That is, the legacy adaptor may provide an adaptor function through an interaction with a mobile IM platform service provider.

The mobile IM enabler 1840 may be included as an internal configuration of a program executor 1820 or may be configured as a separate system to interact with the program executor 1820. In the present embodiment, the mobile IM enabler 1840 may provide a communication channel with a user participating in a broadcast program, and may serve to open a chatting room for the broadcast program through a buddy setting with a user that is to participate in the broadcast program. Further, in the present embodiment, the mobile IM enabler 1840 may serve to provide a group chatting environment in which a user is capable of concurrently participating in a program together with a plurality of buddies on a mobile IM. In a group chatting environment on a mobile IM according to the present embodiment, it is possible to concurrently support a participation in a broadcast program and a conversation between buddies.

Hereinafter, the mobile IM enabler 1840 for providing an interactive service for a broadcast program will be described.

Referring to FIG. 18, the mobile IM enabler 1840 may include an interface module (Web-based GUI MO) 1841, a message control module (Message Control Function) 1842, a statistics module (Real-time Monitoring Function) 1843, a buddy management module (Buddy List Control Function) 1844, a chatting room control module (Chatting Room Control Function) 1845, and a response recording module (Score Recording Function) 1846.

The interface module 1841 provides a function capable of verifying information of users (buddies) participating in a program, a message reception/send status, and a response (correct answer/incorrect answer) of a user in a web-based GUI form.

The message control module 1842 may provide a function of triggering the participation intent of a user through a character string based filtering (message matching) and a function of determining whether a response of a participant is a correct answer or an incorrect answer. Also, the message control module 1842 may provide a function of sending a predetermined message to a user (buddy) through interaction message recognition on a program script. Here, a delimiter that enables an authoring module 1812 of the program creator 1810 to identify a type (for example, a question, a hint of the question, etc.) of a corresponding message needs to be created. For example, the message control module 1842 may read a delimiter capable of identifying whether a type of a message to send to a user is a question or a hint, and may indicate the read delimiter on the message displayed through a mobile IM application installed in a terminal of the user. Further, the message control module 1842 may provide a function of sending a message based on a group unit in response to a group participation in a broadcast program. In the case of a group message, the message control module 1842 needs to provide a processing function according to various messages such as a "general conversation message", a "question providing message", a "correct answer presenting message", a "hinting message", and a "hint participation message". In particular, in the case of the group participation, information, such as a "correct answer presenting message" and a "hint participation message", which should not be exposed to other users, is present and thus, a group message may be transferred to users after being filtered through the mobile IM enabler 1840. For example, when a "correct answer presenting message" or a "hint participation message" is received from a user, the received message may be replaced with a predetermined character string and thereby be transferred not to be exposed to other users of a group chatting room. In this instance, the replaced character string of the group message may be transferred to all of the users participating in the group chatting room, or may be transferred to remaining users excluding a message creator.

The statistics module 1843 may provide a statistical function such as the number of users participating in a program, a participation rate for each question, and a correct/incorrect answer rate in real time.

The buddy management module 1844 may provide a function of managing a list of buddies having set a relationship based on an ID on a messenger created by a manager with respect to the broadcast program. In this instance, when a user authentication function is required to set a relationship with a user, the buddy management module 1844 may interact with an authentication system through a legacy SCP or a legacy adaptor.

The chatting room control module 1845 may provide a function of opening a program chatting room for reading chatting room creation information associated with the broadcast program and then verifying whether a user included in a buddy list participates in a corresponding episode of the broadcast program. Here, the chatting room control module 1845 may individually open a program chatting room for each episode of the broadcast program. In the case of using a character string based filtering method, the chatting room control module 1845 may recognize an input of a predetermined character string among character strings input from the user through the program chatting room and may verify the participation intent of the user. Here, the predetermined character string to be used to verify the participation intent of the user may be registered in advance to the message control module 1842 by the program manager. In particular, the chatting room control module 1845 may provide a group chatting function for allowing a participation of a group unit in the broadcast program. In addition, in the case of the group chatting room, the chatting room control module 1845 may provide a function capable of limiting the number of users participating in a chatting room and a function of designating a response order for each user participating in the chatting room, which differs from a general chatting room. Additionally, the chatting room control module 1845 may provide a message filtering function for limiting the program participation with respect to an incorrect answerer among users participating in the chatting room.

The response recording module 1846 may provide a function of recording a success/failure (correct answer/incorrect answer) of a response to a question for each user ID included in a buddy list of a manager ID. Also, the response recording module 1846 may provide a function of storing a hint answer received from a user to be distinguished from a question answer based on a separate flag as expressed by the following Table 1. Information recorded in the response recording module 1846 may be used to calculate statistical information in the statistics module 1843.

TABLE 1

| Field | Data Type | Description |
| --- | --- | --- |
| ProgramID | Varchar (200) | Unique ID of broadcast program |
| PP_BuddyID | Varchar (200) | Representative buddy ID of program provider |
| BuddyID | Varchar (200) | Buddy ID of answerer (user) |
| Question_Msg_No | Char (50) | Unique number of question |
| Answer_Correct | Boolean | Whether response to question is correct or incorrect answer |
| HintAnswer | Boolean | Whether hint answer is present |

Also, the response recording module 1846 may provide a function of registering success/failure of response to a question based on a group unit. Here, in an example in which a question solution proceeds based on a group unit, scores may be acknowledged and thereby recorded only when the entire participants within a group have successfully made responses.

When providing an individual question, the mobile IM enabler 1840 constructed as above may determine whether to give a hint for a corresponding question based on a hint input status, and may employ a character string matching method as an example of the determining method. Also, the mobile IM enabler 1840 is to provide a program participation function of a group unit through a mobile IM and thus, may provide various participation methods and question solution methods, such as receiving, from participants of a group chatting room, answers in order designated in the group chatting room using a characteristic of the group chatting room so that a user may participate in the broadcast program, or supporting a program participation when the number of participants is greater than or equal to the number of users designated based on a group unit. Accordingly, a participant may use an additional service through a participation of a group unit in a broadcast program, and a program provider may improve the concentration on a program and achieve a lock-in effect with respect to a program participant during an air time by limiting the number of users participating in a group. Also, the program provider may provide a customized service such as providing a product and giving a predetermined quiz question through a separate user management.

A mobile IM application 1860 installed in a terminal of a user may include a user management module (Chatting UI Manager) 1861. In this instance, when an ID of a conversation partner requested by the user to create a chatting room is not a personal ID, for example, in the case of a special service such as an interactive broadcast program, the UI management module 1861 may provide a function of visually expressing participation information about the corresponding program by changing a chatting UI. To this end, the UI management module 1861 supports a function capable of changing a chatting room of a program participated in by the user using a background image or a window UI set by the program manager.

Further, the UI management module 1861 needs to provide a separate group chatting UI function in order to support a group chatting as a broadcast program participation method. Also, the UI management module 1861 may provide a "send" unit for sending a general message, a UI for inputting an "answer" to a question, and a separate UI for inputting a "response" to a hint, as UIs for a user input in a program chatting room. That is, the UI management module 1861 may activate the UI for inputting an "answer" to a question and in this instance, may verify whether a hint is given for the question. In this instance, when the hint is given for the question, the UI management module 1861 may also activate the UI for inputting a "response" to a hint. The UI management module 1861 may support a function of inactivating a hint message when a predetermined period of time is elapsed after receiving the hint message based on a characteristic of the hint and a function of providing a hint message one time in a marquee form, as an additional function associated with a hint UI. In the case of a correct response message, the UI management module 1861 may support a message filtering function through an interaction with the mobile IM enabler 1840, such as replacing a real message with a predetermined character string and thereby displaying the replaced character string.

According to the present embodiment constructed as above, a mobile IM enabler is included as a communication channel for a broadcast program and thus, it is possible to support a user participation in a convenient environment by providing various communication functions required for the corresponding broadcast program through a mobile IM service. In addition, in the present embodiment, it is possible to support a participation of a group unit in the broadcast program using a group chatting function of a mobile IM.

FIGS. 19A through 20B are flowcharts illustrating a process of creating a program chatting room in the program enabler service system of FIG. 18.

Figure 19A:
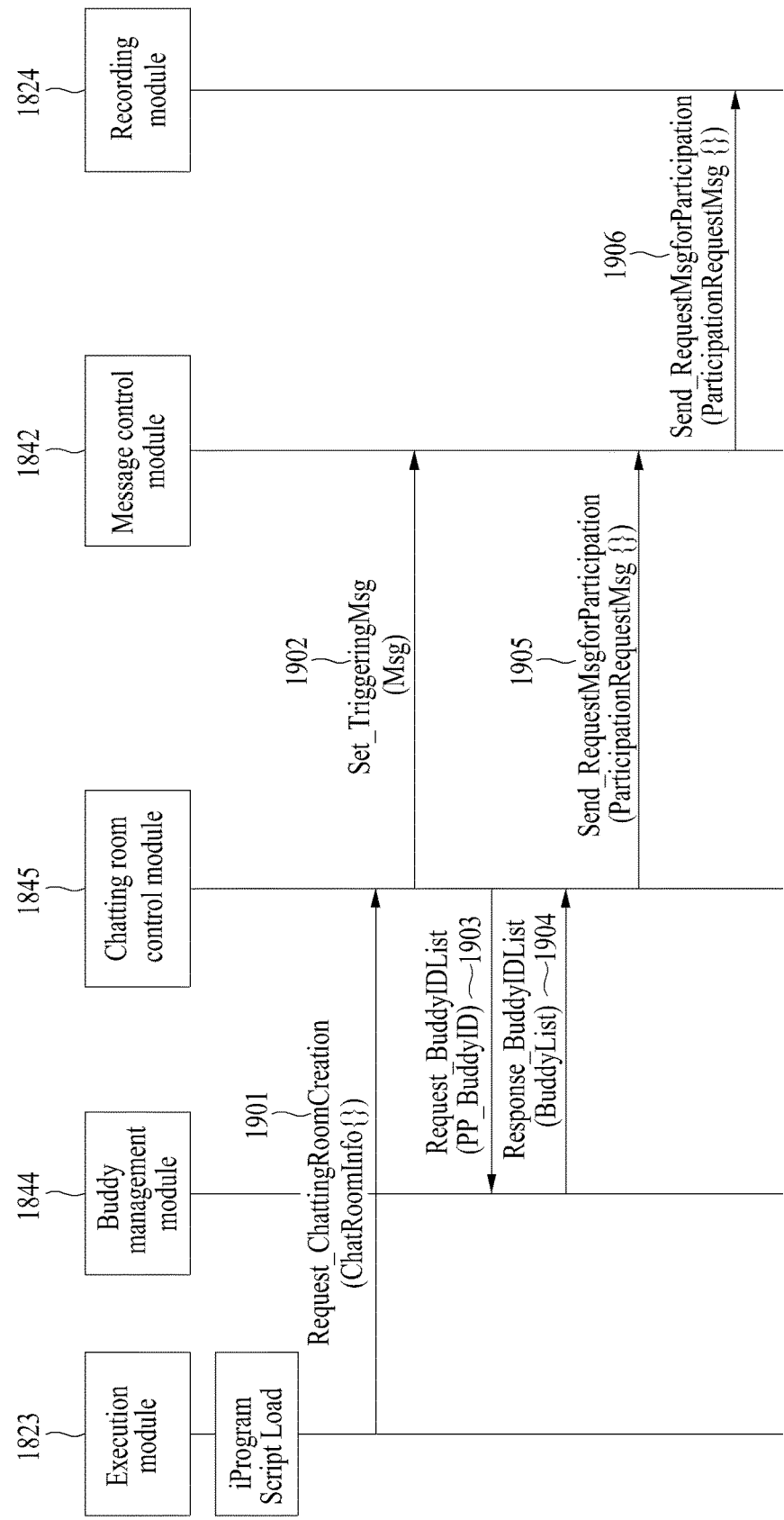
FIGS. 19A through 20B are flowcharts illustrating a process of creating a program chatting room for a user participation on a mobile IM according to an embodiment of the present invention.
Figure 19B:
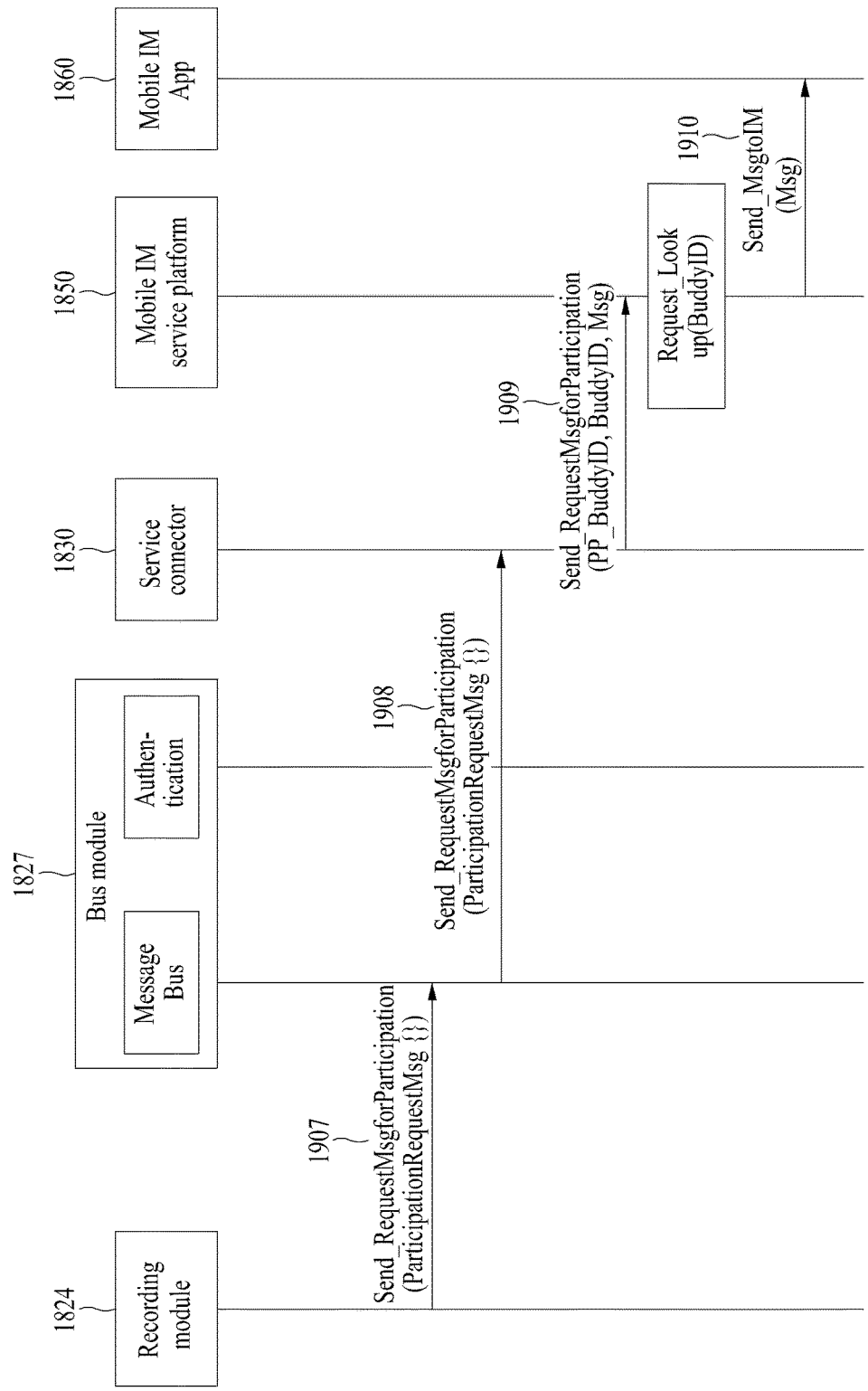

Referring to FIGS. 19A and 19B, an execution engine 1823 of the service executor 1820 loads program information provided in a script format from the program creator 1810 and requests the chatting room control module 1845 to create a chatting room of a corresponding program (1901). Here, in the case of initiating a user participation using a character string matching method, the chatting room control module 1845 transfers a predetermined character string preset by a manager to the message control module 1842 as a message for requesting a program participation, in response to the request of the execution engine 1823 (1902). Also, the chatting room control module 1845 requests the buddy management module 1844 for a list of buddies having set a relationship with respect to an ID of the program manager (1903). In response thereto, the buddy management module 1844 transfers the buddy list registered to the ID of the manager to the chatting room control module 1845 (1904). Accordingly, the chatting room control module 1845 sends, to the mobile IM service platform 1850, a message (hereinafter, a "participation request message") for requesting all the users included in the buddy list for participating in a program. That is, the participation request message is sequentially transferred from the chatting room control module 1845 to the message control module 1842 of providing a function of identifying a message type, from the message control module 1842 to a recording module 1824 of providing an event recording function, from the recording module 1842 to a bus module 1827 of providing a message transfer function, and from the bus module 1827 to the mobile IM service platform 1850 through the legacy adaptor of the service connector 1830 (1905 through 1909). In this instance, the participation request message may be a predetermined character string preset by the manager. In response to the participation request message to a predetermined program received from the program enabler service system, the mobile IM service platform 1850 sends the participation request message to terminals (mobile IM application 1860) of all the users included in the buddy list of the manager (1910).

Figure 20A:
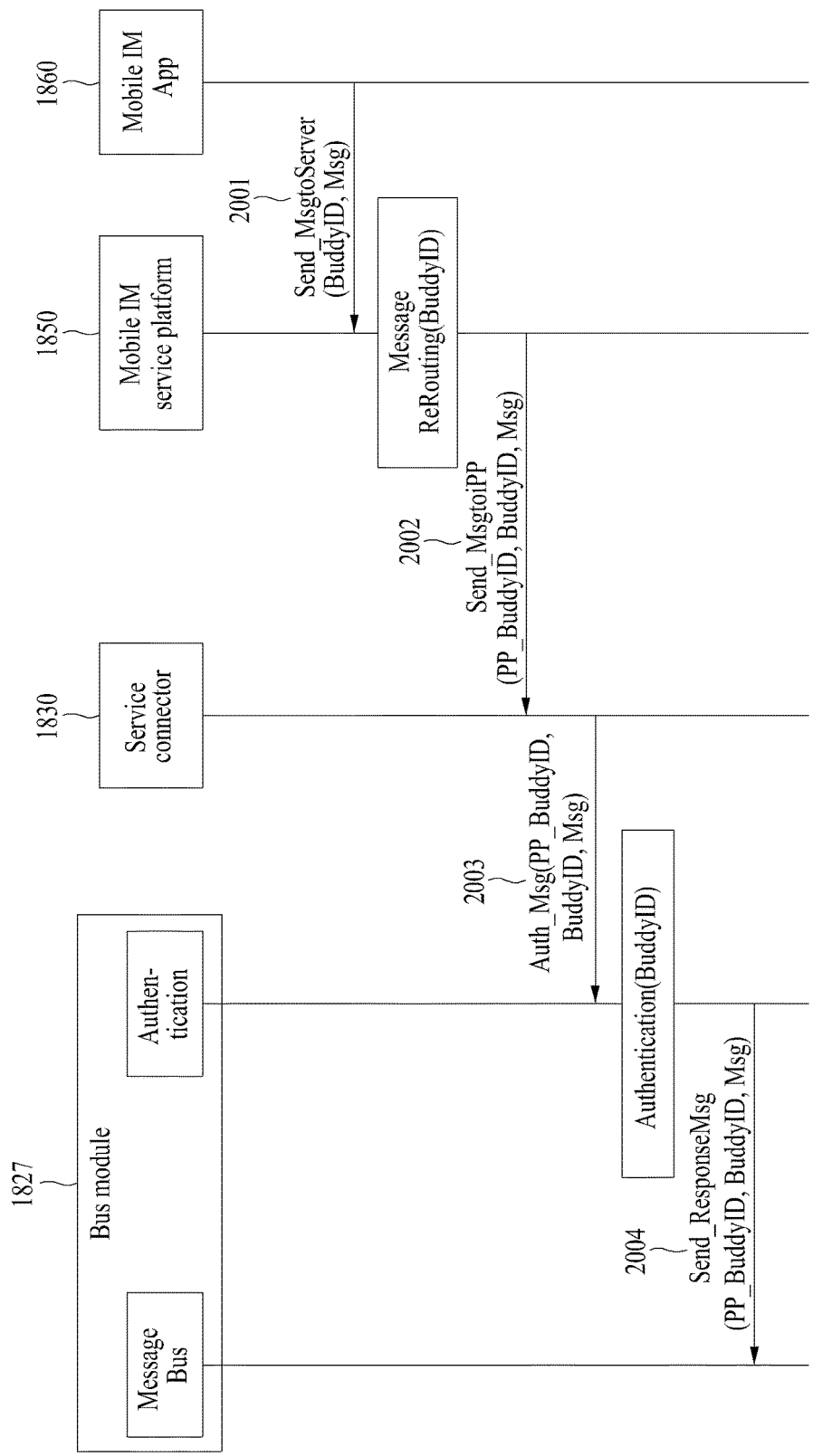
Figure 20B:
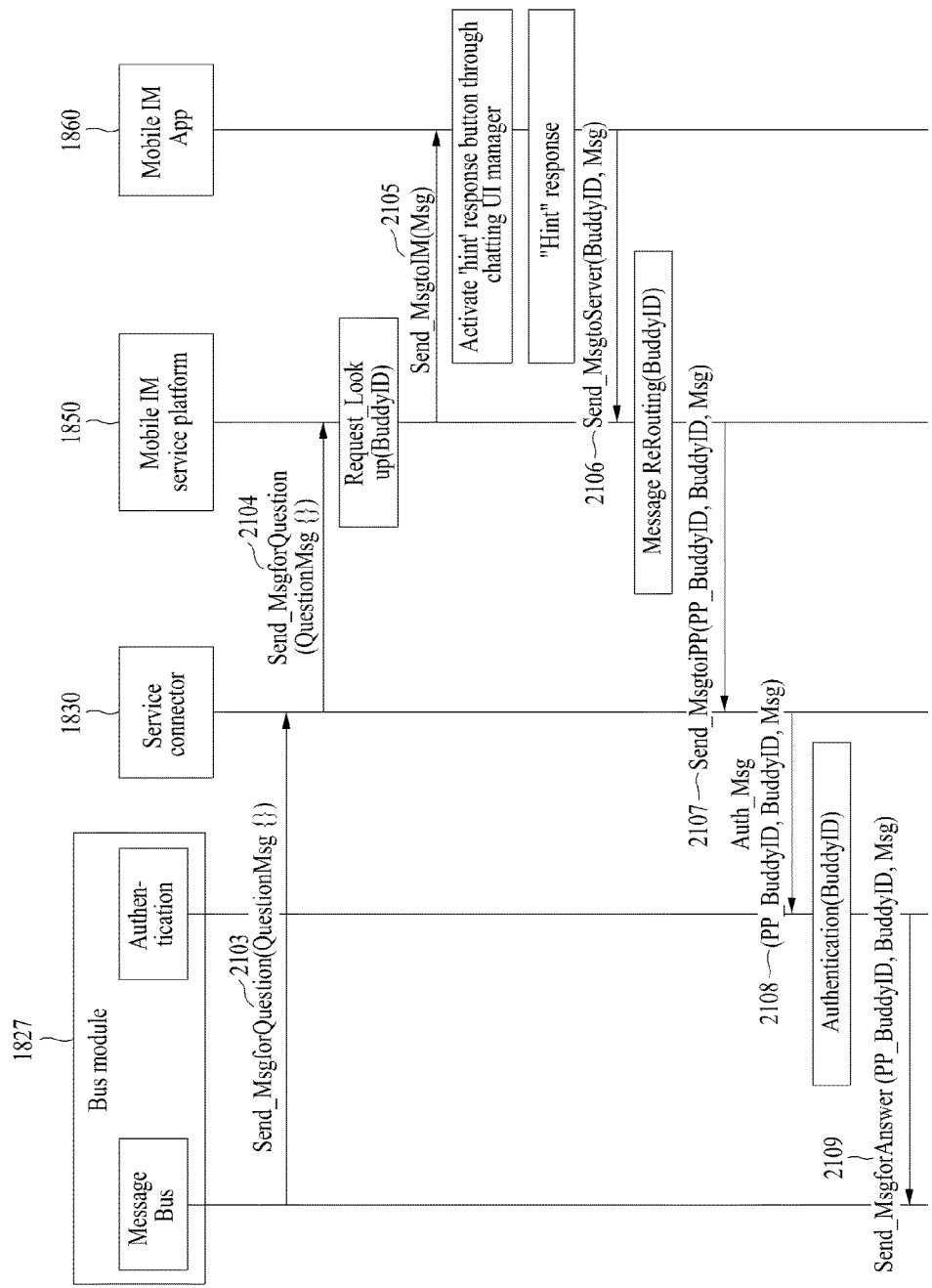

Referring to FIGS. 20A and 20B, the mobile IM application 1860 displays the participation request message received from the mobile IM service platform 1850, receives a response message to the participation request message from a user, and transfers the response message to the mobile IM service platform 1850 (2001). In this instance, the mobile IM service platform 1850 transfers the response message to the program enabler service system of the manager through a legacy adaptor of the service connector 1830 (2002). The response message of the user is sequentially transferred from the legacy adaptor of the service connector 1830 to the bus module 1827 of providing a user authentication and message sending function, and from the bus module 1827 to the message control module 1842 of providing a function of determining whether a character string matches (2003 through 2005). Here, in the case of initiating the user participation using a character string matching method, the message control module 1842 may determine whether a predetermined character string is included in the response message. The message control module 1842 receives the intent for participating in the program from a user using the character string matching method or a general push method, and requests the chatting room control module 1845 to create a chatting room (2006). Accordingly, the chatting room control module 1845 opens a program chatting room in which the user having expressed the participation intent through the response to the program participation message participates. The chatting room control module 1845 may open a program chatting room for each episode of the broadcast program. Here, log information (manager ID, a user ID, a created date, etc) of the opened program chatting room may be recorded in the recording module 1824 (2007).

Figure 21A:
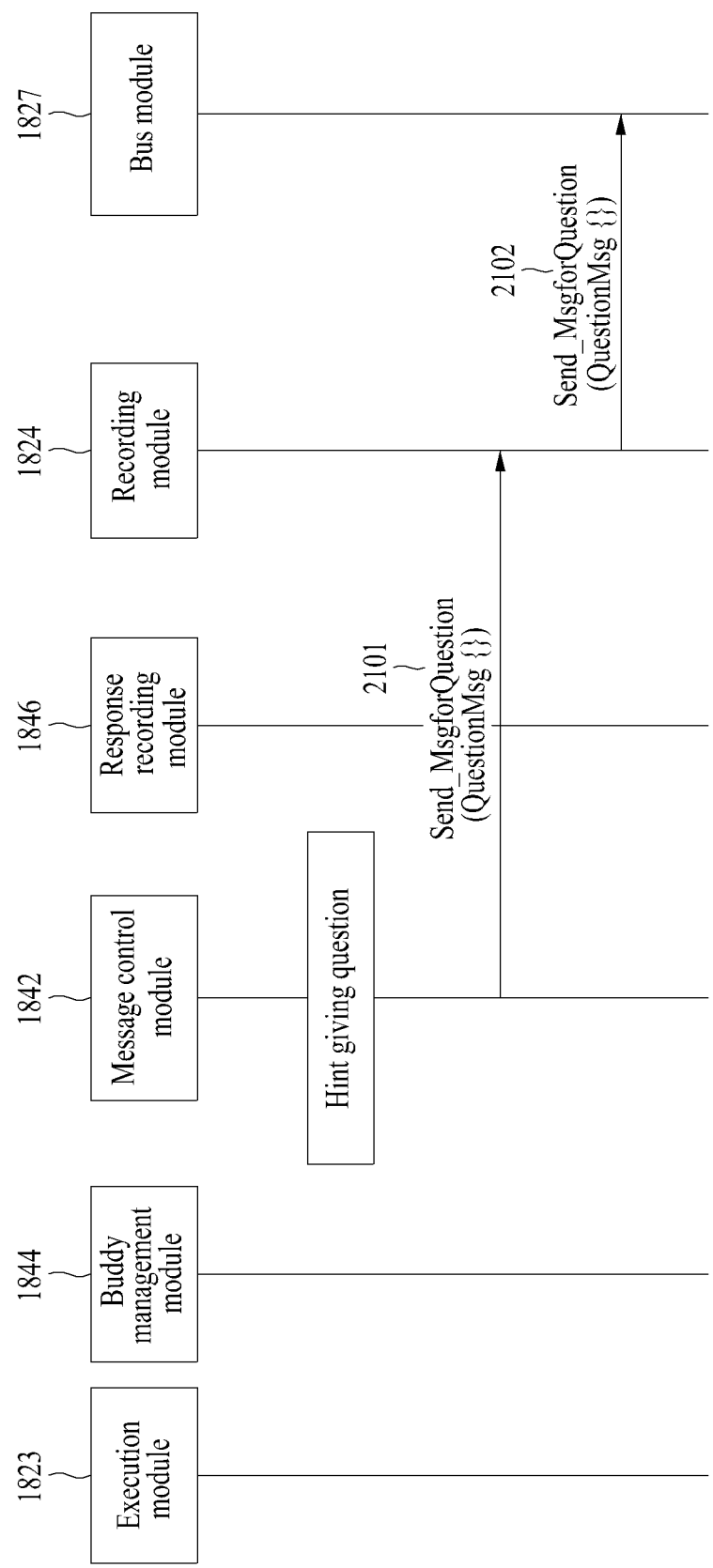
FIGS. 21A through 21C are flowcharts illustrating a process of providing a question and a hint of the question through a mobile IM during a program progress according to an embodiment of the present invention.
Figure 21B:
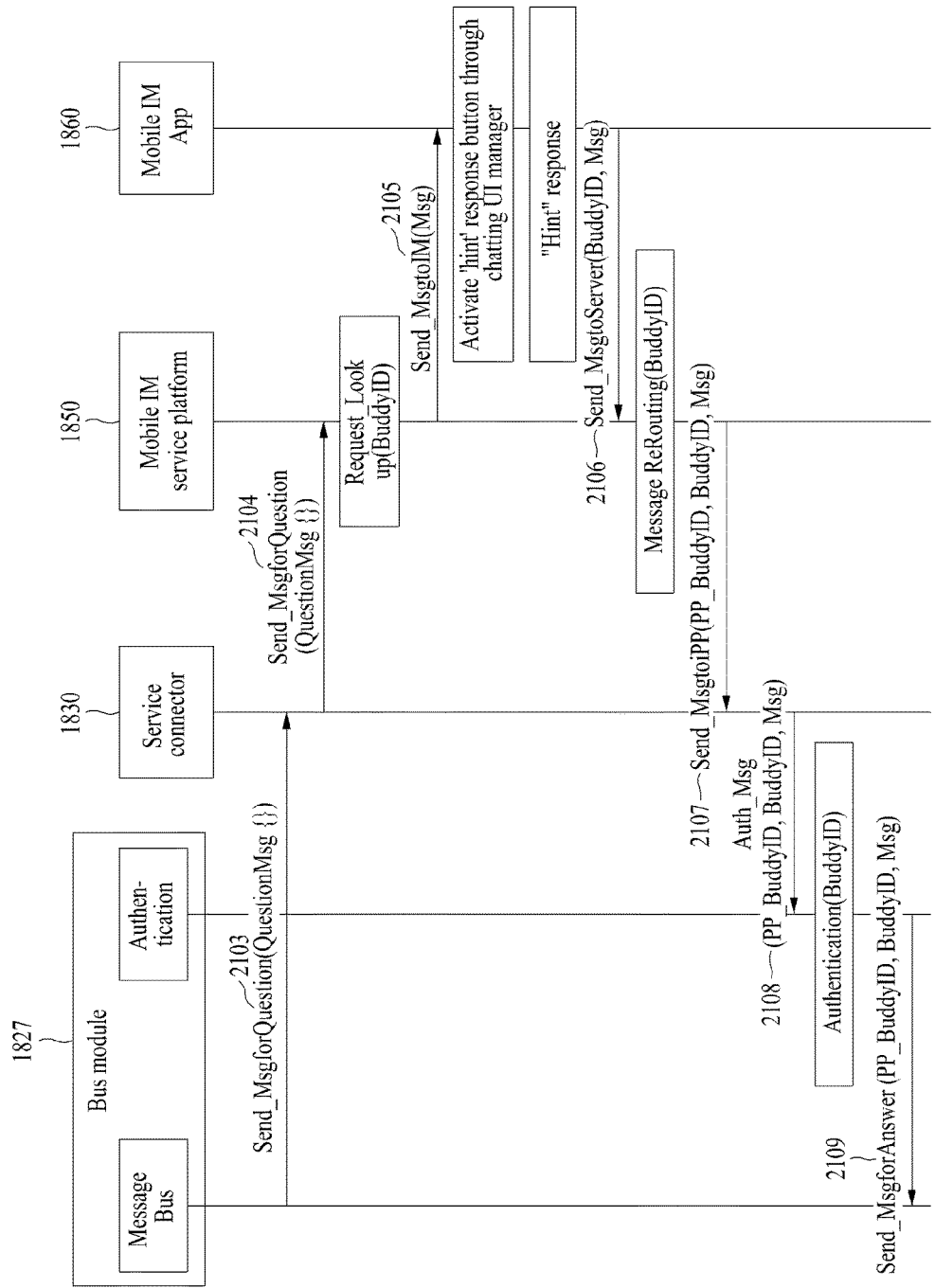
Figure 21C:
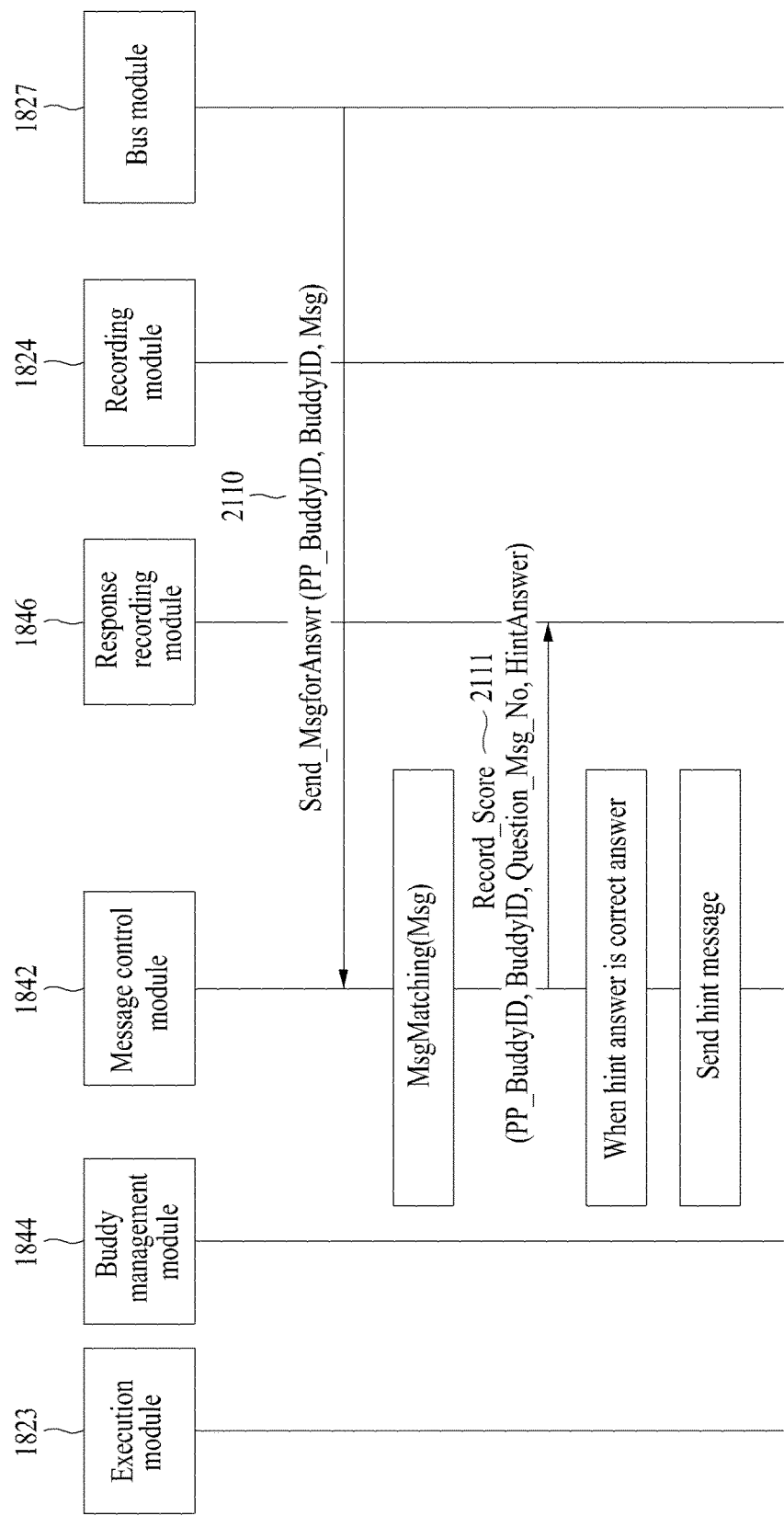

FIGS. 21A through 21C are flowcharts illustrating a process of providing a hint of a question in the program enabler service system of FIG. 18.

FIGS. 21A through 21C, when a question including a hint is given during a program execution, the message control module 1842 of the mobile IM enabler 1840 provides a query message (question message) for giving a hint. Here, the question message indicates a hint giving question preset by a manager. The hint giving question is sequentially transferred from the message control module 1824 to the recording module 1824 of providing an event recording function, from the recording module 1824 to the bus module 1827 of providing a message transfer function, and from the bus module 1827 to the mobile IM service platform 1850 through the legacy adaptor of the service connector 1830 (2101 through 2104). In response to the hint giving question received from the program enabler service system, the mobile IM service platform 1850 transfers the received hint giving question to a terminal (mobile IM application 1860) of a user participating in the program chatting room (2105).

The mobile IM application 1860 may activate a UI for inputting a "response" to a hint through the UI management module 1861 and may receive a response to the hint giving question from the user through the activated UI. Accordingly, the mobile IM application 1860 transfers the response of the user to the hint giving question to the mobile IM service platform 1850 (2106). The mobile IM service platform 1850 transfers the response message of the user to the program enabler service system of the manager through the legacy adaptor of the service connector 1830 (2107). The response of the user to the hint giving question is sequentially transferred from the legacy adaptor of the service connector 1830 to the bus module 1827 of providing a user authentication and message transfer function, and from the bus module 1827 to the message control module 1842 of providing a function of determining whether a character string matches (2108 through 2110). Here, the message control module 1842 may determine whether the response message received from the user to the hint giving question is a correct answer using the character string matching method. The message control module 1842 transfers the hint answer of the user to the response recording module 1846 to record whether the hint answer is a correct answer or an incorrect answer (2111). When the hint answer of the user is a correct answer, the message control module 1842 may send a hint message set for the hint giving question to a terminal (mobile IM application 1860) of the corresponding user through the aforementioned process (2101 through 2105).

Figure 22B:
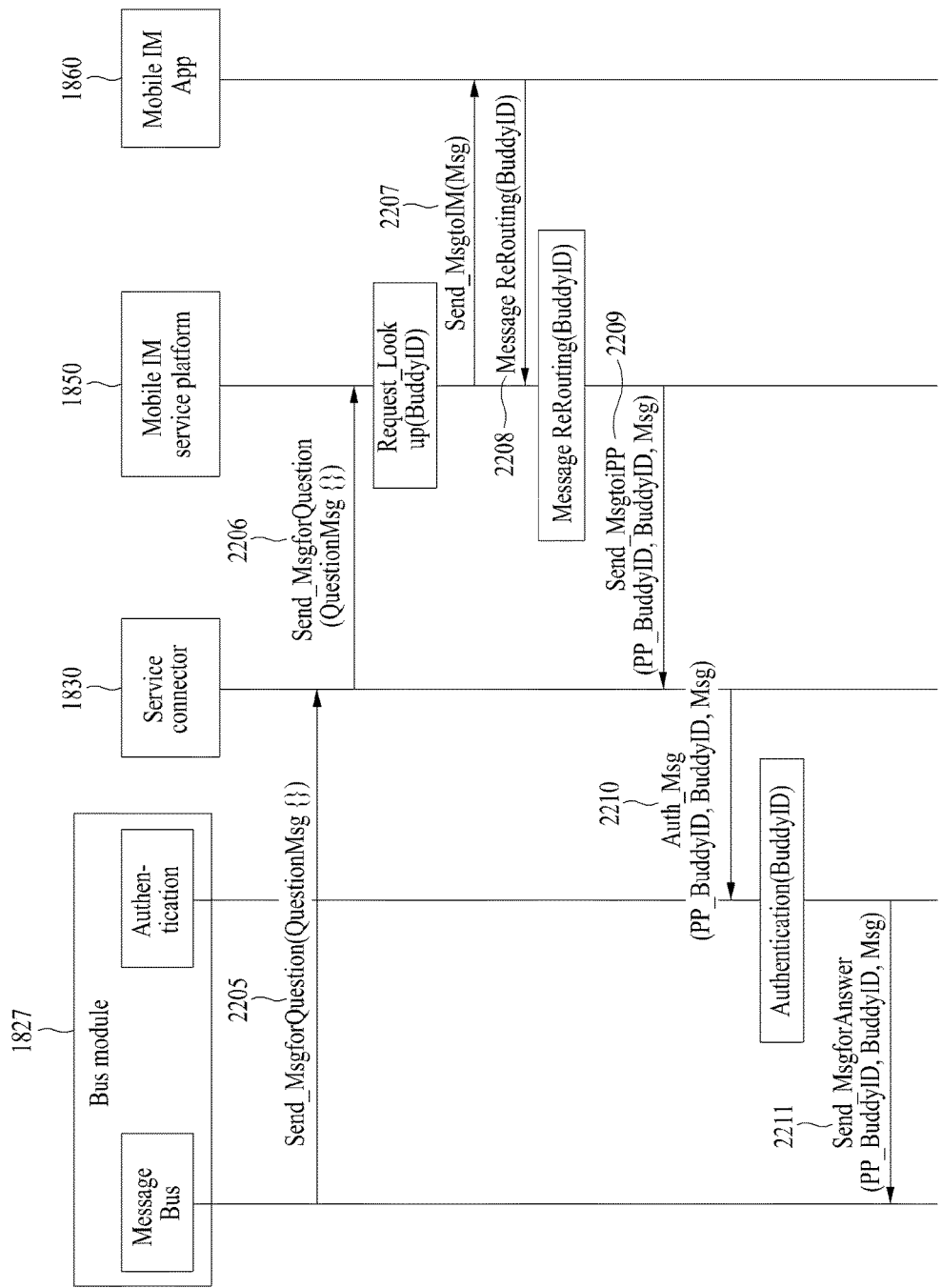

FIGS. 22A through 22C are flowcharts illustrating a process of providing an interactive question in which a condition is set between questions in the program enabler service system of FIG. 18.

Referring to FIGS. 22A through 22C, the message control module 1842 of the mobile IM enabler 1840 may determine whether there is any remaining question and whether the remaining question is an interactive question, and may request recording of a previous question when the remaining question to be given is the interactive question. As an example, the message control module 1842 may request the response recording module 1846 of providing a function of recording a correct answer or an incorrect answer for each user, to verify whether a response of a user to a previous question is a correct answer or an incorrect answer, or may request the statistics module 1843 of providing a statistical function for a correct/incorrect answer rate for each question, to verify a correct answer rate of the previous question (2201). The message control module 1842 may give a subsequent question based on records about the previous question, such as giving a subsequent question only to a user having sent a correct answer to the previous question through a response 2202 of the response recording module 1846, or giving a subsequent question based on a correct answer rate of the previous question through the response 2202 of the statistics module 1843. The given question is sequentially transferred from the message control module 1842 to the recording module 1824 of providing an event recording function, from the recording module 1824 to the bus module 1827 of providing a message transfer function, and from the bus module 1827 to the mobile IM service platform 1850 through the legacy adaptor of the service connector 1830 (2203 through 2206). In response to the question received from the program enabler service system, the mobile IM service platform 1850 sends the received question to a terminal (mobile IM application 1860) of a user having sent a correct answer to the previous question or a user participating in a program chatting room (2207).

The mobile IM application 1860 displays the question received from the mobile IM service platform 1850, receives a response message to the question from the user, and transfers the received response message to the mobile IM service platform 1850 (2208). In this instance, the mobile IM service platform 1850 transfers the response message to the program enabler service system of the manager through the legacy of the service connector 1830 (2209). The response of the user to the question is sequentially transferred from the legacy adaptor of the service connector 1830 to the bus module 1827 of providing a message transfer function, and from the bus module 1827 to the message control module 1842 of providing a function of determining whether a character string matches (2210 through 2212). In this instance, the message control module 1842 may determine whether the response message received from the user to the question is a correct answer using the character string matching method, and transfers the response message of the user to the response recording module 1846 to record whether the response of the user to the question is a correct answer or an incorrect answer.

Accordingly, the program enabler service system according to the present invention may support an environment capable of directly executing an interactive broadcast program produced using an editor for producing the interactive broadcast program through association between the editor and various services. The program enabler service system according to the present invention may use a mobile IM service as a user participation means to a broadcast program, and may provide an environment in which users are capable of participating in a broadcast program based on a group unit using a group chatting function of a mobile IM.

Hereinafter, a program enabler service method for providing a user participative interactive broadcast service will be described. Operations included in the program enabler service method according to the present invention may be performed by the program enabler service system of FIG. 18.

Figure 23:
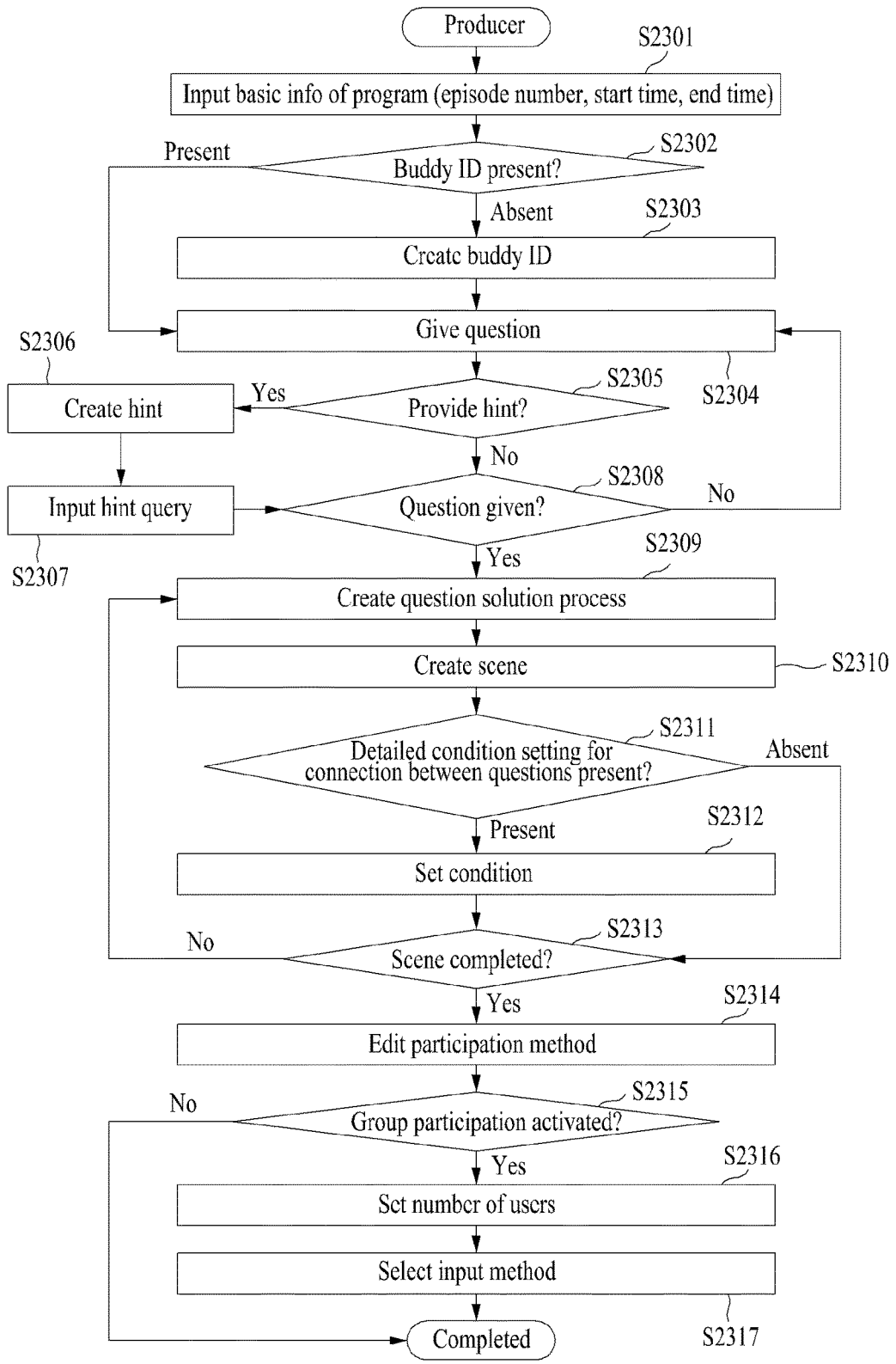
FIG. 23 is a flowchart illustrating a method of producing an interactive broadcast program by a producer in a program enabler service method according to an embodiment of the present invention.

FIG. 23 is a flowchart illustrating a method of creating, by a producer, an interactive broadcast program according to an embodiment of the present invention.

Referring to FIG. 23, the program enabler service system may receive basic information of a program from a producer by providing an editor screen (FIG. 4/FIG. 6) for inputting basic information of the program in response to a request of the producer (S2301). In this instance, basic information of the program may include a name of the program, an episode of the program, cast information, and an air time (start time and end time). Here, the program enabler service system determines whether a buddy ID associated with the program is present (S2302), and creates a buddy ID of the program when the buddy ID is absent (S2303). When using a mobile IM as a communication channel with the user, a program manager is also regarded as a single buddy ID and the buddy ID associated with the corresponding program needs to be created to give a question and receive a response through the mobile IM.

When the buddy ID of the program input from the producer is already present or when the buddy ID of the manager is created through the above process, the program enabler service system may receive a question to be given from the producer by providing an editor screen (FIG. 6) for inputting a question to be given during a broadcasting (S2304). The program enabler service system may receive, from the producer, contents of a question, consultation, a type of the question, and examples of a multiple-choice question through the question screen. When the producer is to provide a hint as an option associated with the question, the program enabler service system may receive a hint text, a target to receive a hint, a hinting method, and a hint query through an editor screen (FIG. 8) for setting an option (S2305 through S2307).

When a question creation of the producer is completed (S2308), the program enabler service system may receive a question giving order and a question giving method from the producer by providing an editor screen (FIGS. 11 through 13) for setting a question solution process. That is, the program enabler service system may create an individual round (scene) for a predetermined episode of the broadcast program by creating a question solution process based on an input of the producer (S2309 through S2310). In this instance, when a detailed condition setting for connection between questions is required, the program enabler service system may receive a detailed condition associated with an interactive question from the producer through an editor screen (FIG. 13) (S2311 through S2312). For example, when questions A and B are set as a question to be given in successive to a previous question, a detailed condition for selecting a subsequent question may be set by the producer based on a correct answer rate of a first question.

When a creation of all the rounds for a predetermined episode of a broadcast program is completed through the aforementioned process, the program enabler service system may edit a user participation method with respect to the corresponding program (S2313 and S2314).

Also, the program enabler service system may receive, from the producer, an input on whether to activate a group participation for supporting a participation of a group unit in the broadcast program (S2315). In this instance, when a group participation function is activated by the producer, the program enabler service system may set the number of users included in the group unit based on the input of the producer (S2616). That is, it is possible to limit the number of users participating in the group chatting room by setting the number of users included in the group unit. Also, the program enabler service system may set a response input method of the user to the question or the hint (S2317). Here, the response input method may include a sequential input method for sequentially receiving user responses in predetermined order and a free input method for randomly receiving user responses regardless of order.

As described above, the program enabler service system may input basic information of a broadcast program through the input of the producer, may input an interactive object, and may set various types of relevant environments.

Figure 24:
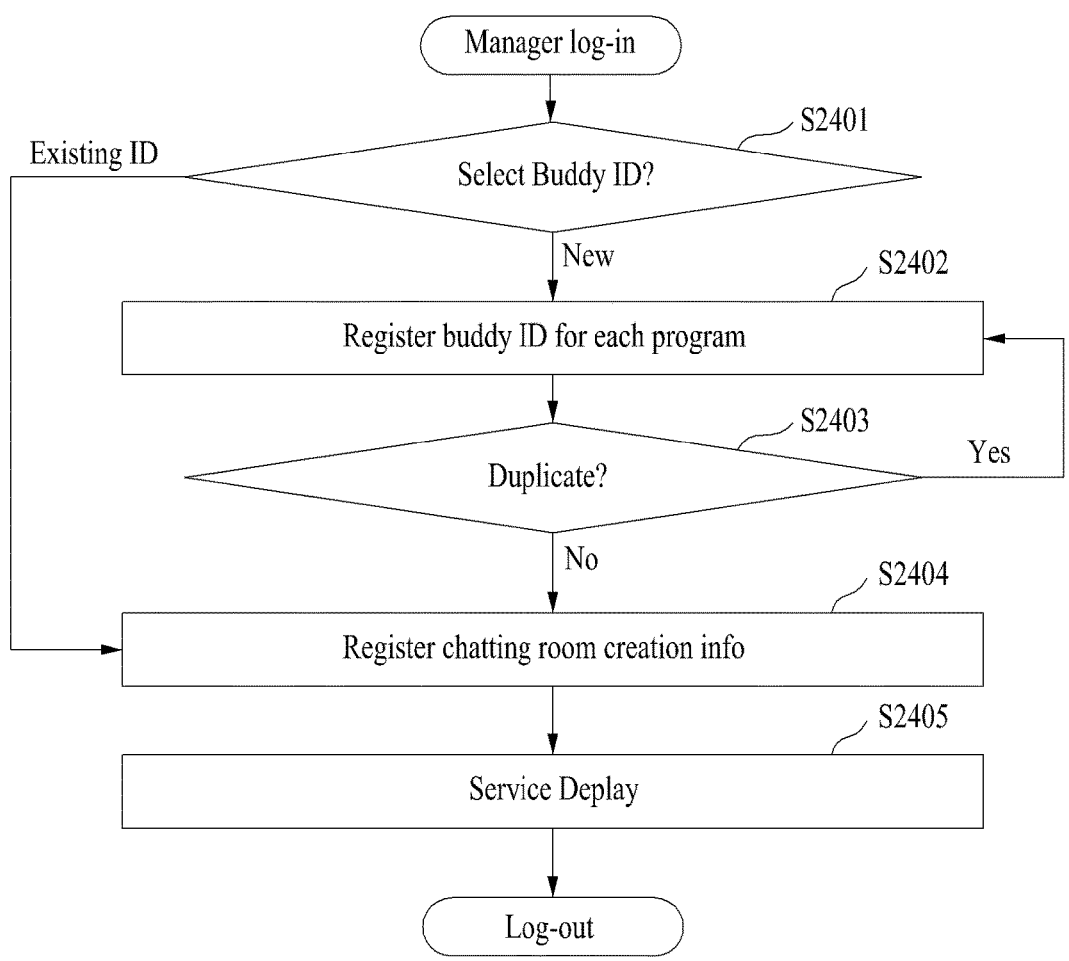
FIG. 24 is a flowchart illustrating a method of creating a program identifier (ID) by a program manager in a program enabler service method according to an embodiment of the present invention.

FIG. 24 is a flowchart illustrating a method of creating, by a program manager, a program ID according to an embodiment of the present invention.

The program manager refers to an operator operating an interactive service of a broadcast program, and is in charge of logging in the program enabler service system (that is, a portal module 1821) through a separate account and inputting and loading a basic interactive service creation condition.

Referring to FIG. 24, when a new program (or a new episode) is selected by a manager, the program enabler service system registers a new buddy ID for each corresponding program (S2401 and S2402).

In this instance, the program enabler service system may determine whether the buddy ID registered by the manager is duplicated, and may create a chatting room associated with the corresponding buddy ID when the buddy ID is determined not to be duplicated (S2403 and S2404). Accordingly, the program enabler service system may use the chatting room created based on the buddy ID of the manager as a communication channel for an interactive service of the corresponding program (S2405). Here, the program enabler service system may support a group participation in the broadcast program by providing a chatting room of a group unit based on the buddy ID of the manager.

Accordingly, when using a mobile IM for an interactive service of a program, the program enabler service system may need to create a buddy ID of the manager and may create a chatting room (that is, a program participation room) based on the buddy ID of the manager.

Figure 25:
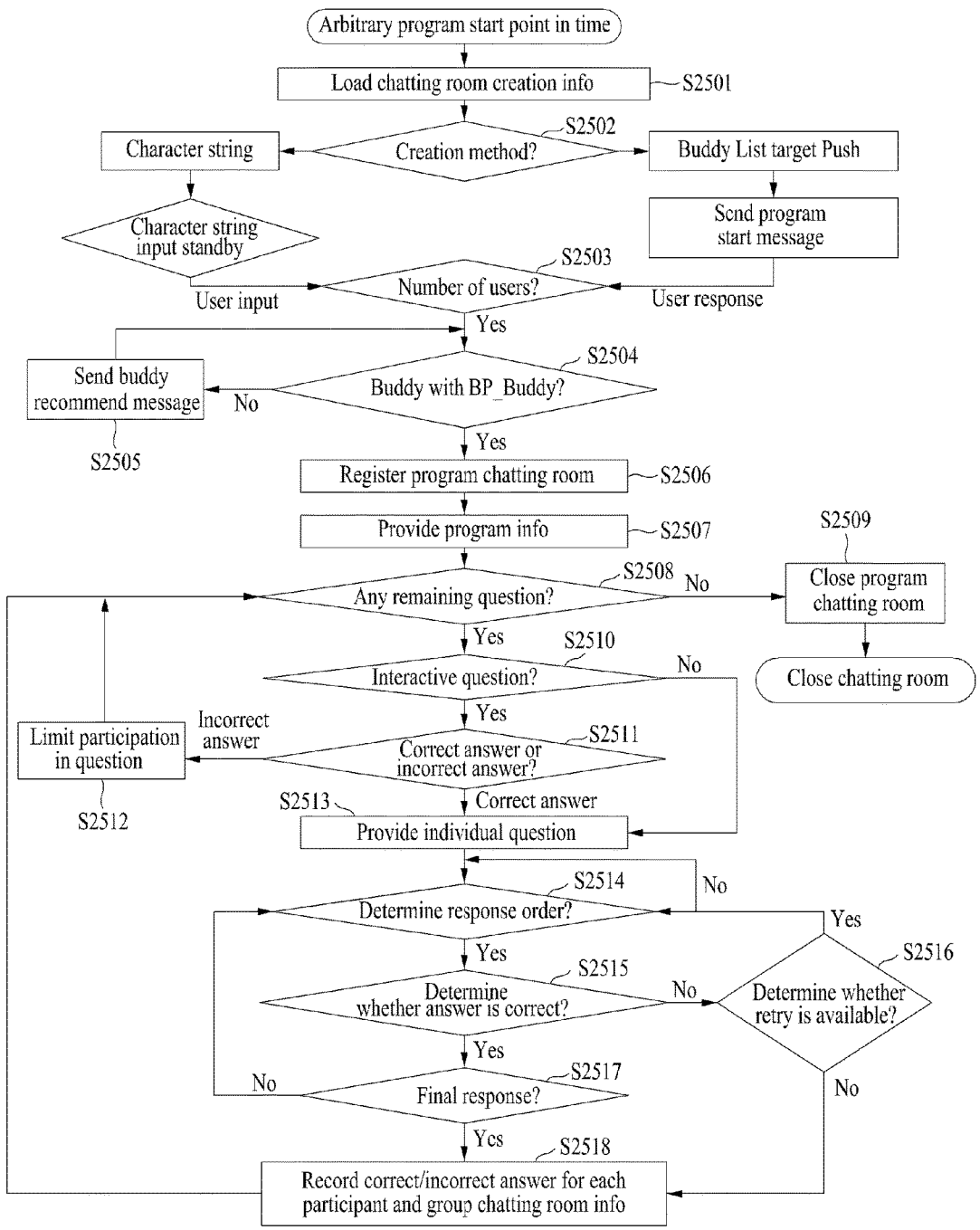
FIG. 25 is a flowchart illustrating a method of executing a broadcast program in interaction with an interactive service enabler in a program enabler service method according to an embodiment of the present invention.

FIG. 25 is a flowchart illustrating a method of executing a broadcast program produced through an editor proposed herein in interaction with an interactive service enabler according to an embodiment of the present invention.

Referring to FIG. 25, a program enabler service system may load corresponding program information provided in a script format in order to create a chatting room for a predetermined program at an arbitrary point in time (S2501). That is, the program enabler service system may load chatting room creation information required for a corresponding episode by calling a service enabler (for example, the mobile IM enabler 1840) through a management module 1822 at an arbitrary program start point in time and by enabling the service enabler to load a program script created through the authoring module 1812.

The program enabler service system may determine a chatting room creation method (that is, whether to open a chatting room) and may also determine the designated number of users in the case of a participation of a group unit, and then may register a user as a participant in a corresponding program chatting room based on the determined chatting room creation method and number of users (S2502 through S2506).

Figure 26:
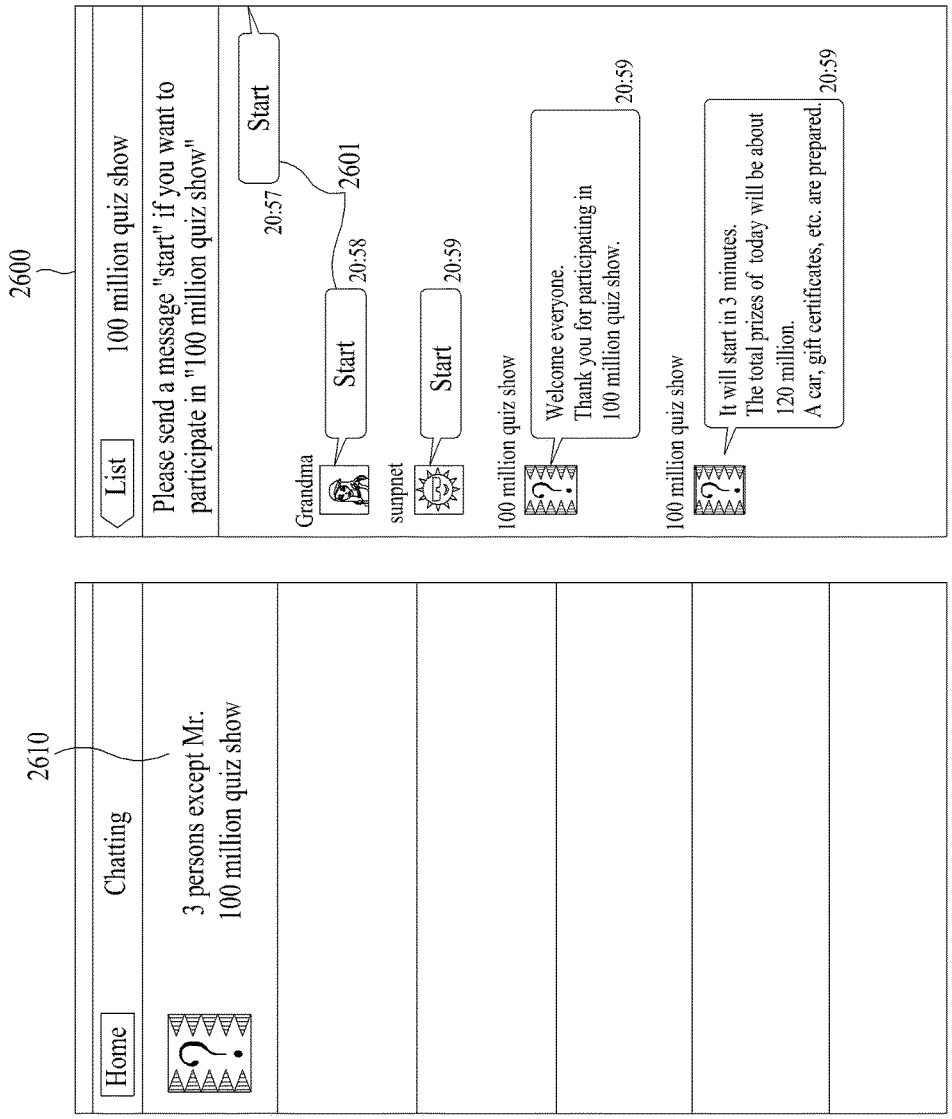

Referring to FIG. 26, in a predetermined character string input standby method, even though a program enabler service system does not send a separate message, a user may directly execute a corresponding chatting room 2600 using a program ID and may input a "character string" 2601 indicating a program participation intent. Here, the "character string" indicating the program participation intent is notified to all the users viewing a program. For example, "start" and "participate" may be used as a predetermined character string indicating the program participation intent. That is, a mobile IM enabler of the program enabler service system may determine whether a character string input from a user through a chatting room of a program ID matches the predetermined character string indicating a broadcast program participation intent and when they match, may set the user as a buddy of the program ID and allow the user to participate in the broadcast program through a corresponding chatting room. In this instance, when setting the user as the buddy of the program ID using the character string matching method, a buddy relationship with the program ID may be maintained during an air time of the broadcast program and a buddy setting with the user may be automatically canceled when the broadcast program is terminated. Further, in the case of a group participation using the character string matching method, when an existing group chatting room for the broadcast program is present in a chatting list 2610, the participation intent for a current episode of the corresponding broadcast program may be transferred by additionally inputting a separate message through the group chatting room present in the chatting list 2610.

Figure 27:
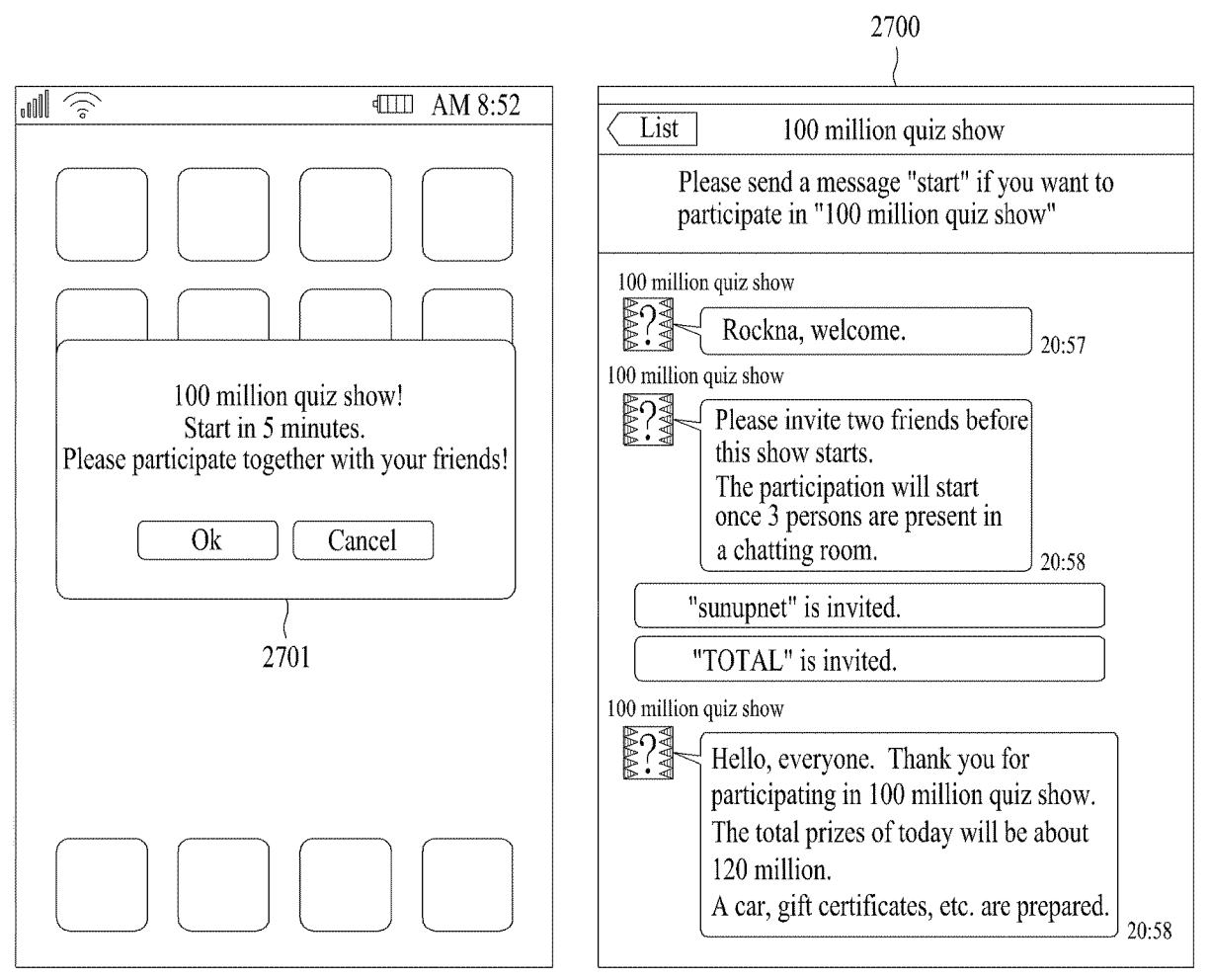

As another example, a buddy list target push method triggers a participation by sending a program start message to users having expressed a program participation intent in advance through making a friend with the program ID using the program enabler service system. Referring to FIG. 27, a program start message 2701 is pushed to all the users set as buddies and thus, a user may participate in a corresponding program by executing a chatting room 2700 at any time. That is, to trigger a participation in a broadcast program through a chatting room of the program ID, the mobile IM enabler of the program enabler service system may transfer a participation request message to users having set a buddy relationship in advance with the program ID using a message push method. Also, in the case of a group participation using the message push method, the program enabler service system may trigger a group participation in the corresponding broadcast program by providing a message 2701 indicating that "group participation" is available before a broadcast starts.

In a situation of triggering the group participation in the broadcast program, the program enabler service system may determine whether a user that is to participate in a group chatting room has set a buddy relationship with the program ID and may send a buddy recommend message to a user having not set a buddy relationship with the program ID, thereby inducing the user to set the buddy relationship with the program ID (S2504 and S2505).

The program enabler service system may provide program information to users participating in the program chatting room (S2507). Here, in the case of a program that gives a question during an execution of the program, the program enabler service system determines whether there is any un-given question and closes the program chatting room when no question remains (S2508 and S2509). In contrast, when any question remains, the program enabler service system may provide a subsequent individual question. In addition, when any question currently remains and the remaining question is an interactive question that interacts based on a result of a previous question, the program enabler service system may determine whether a user response to the previous question is a correct answer or an incorrect answer, may limit a participation in the remaining question to a user having input an incorrect answer and may provide an individual question corresponding to the remaining question to a user having input a correct answer (S2510 through 2513).

When a hint is set as a question option by a producer in providing a remaining individual question, the program enabler service system may provide a query for giving a hint through the program chatting room while a solution of the question given in operation S2513 is ongoing, and then wait for an input of the user to the query. In this instance, the UI management module 1861 of the mobile IM application 1860 installed in a terminal of the user may provide an answer UI for inputting an "answer" to the question and a hint UI for inputting a "response" to the hint as UIs for user input in the program chatting room. That is, when the user creates a message in the program chatting room and uses the answer UI, it may be input as the answer to the question. When the user uses the hint UI, it may be input as the response to the hint. The program enabler service system may receive each response through a UI classified on the terminal of the user or may receive each response through combination of hash character string values. Accordingly, when a response to a hint giving query is received from the user through the program chatting room, the program enabler service system determines whether the response matches a hint query preset by the producer using the character string matching method. In this instance, when the response of the user to the hint giving query matches the preset hint query, the program enabler service system may give a hint of the question given in operation S2513.

Figure 28:
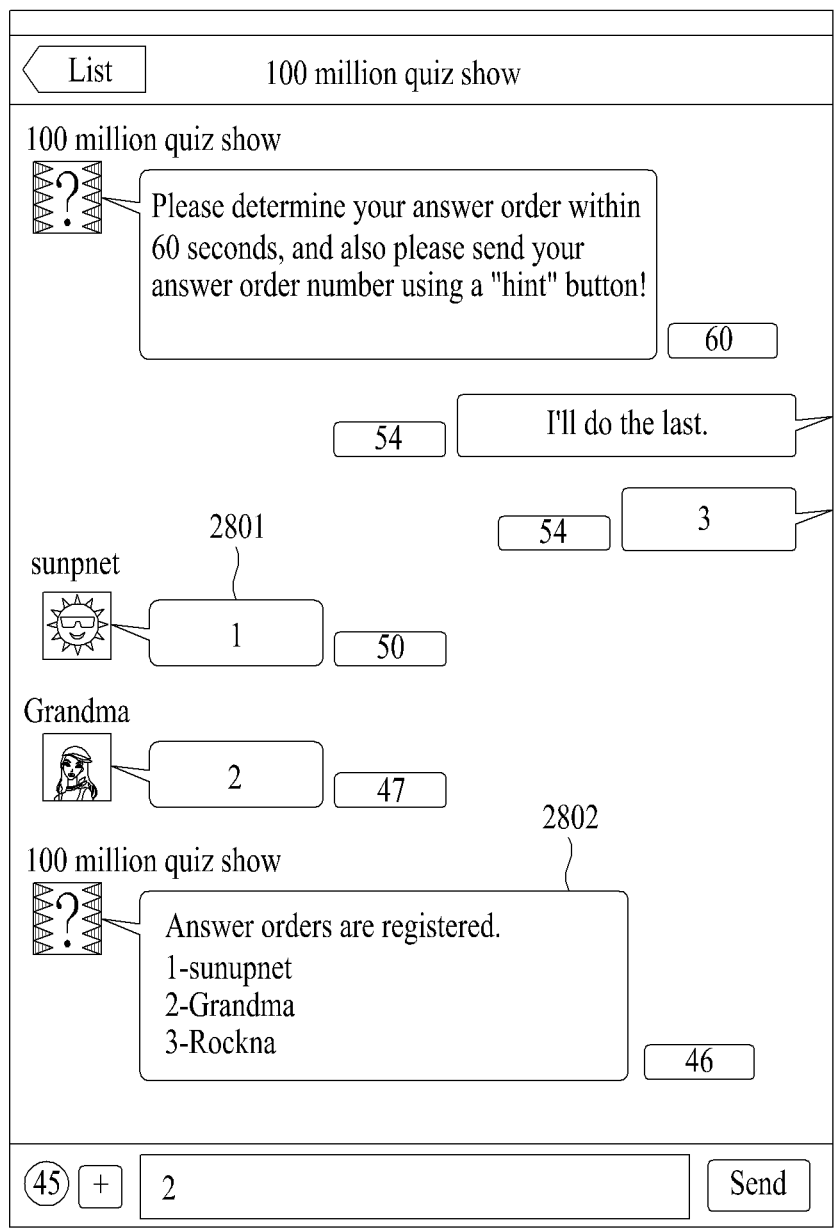
FIGS. 28 through 30 illustrate examples to describe a method of determining orders of users to participate in a broadcast program according to an embodiment of the present invention.
Figure 29:
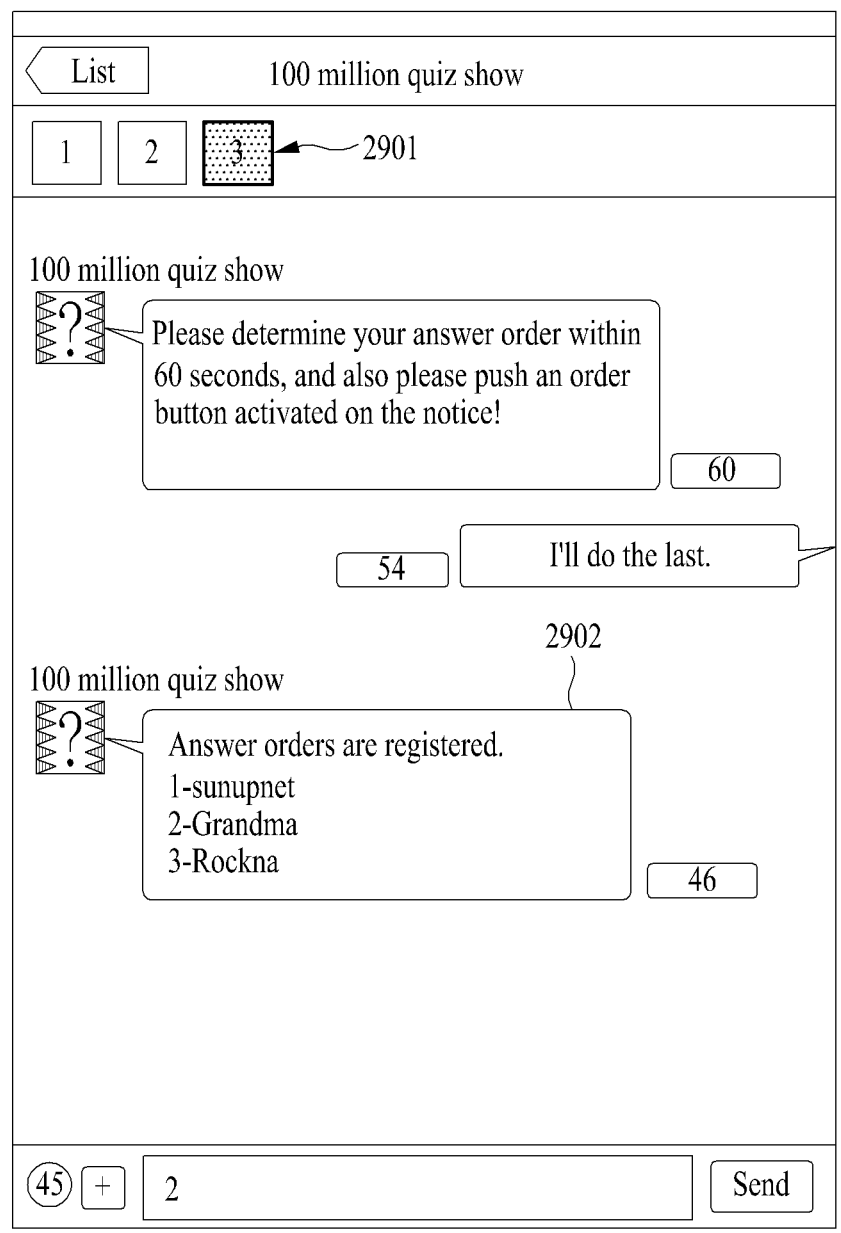
Figure 30:
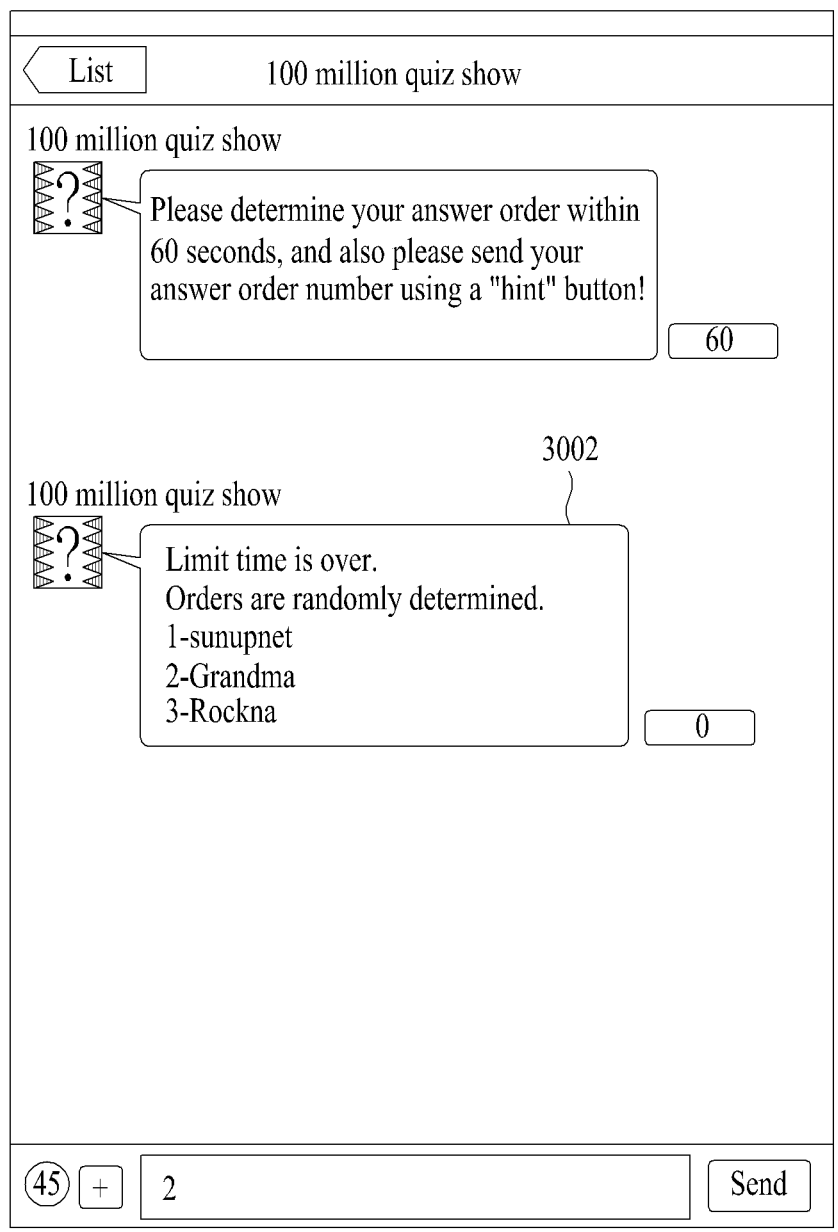

In the case of a group participation in the broadcast program, the program enabler service system determines a question response order determined within the program chatting room with respect to an individual question (S2514). In this instance, when giving a question, the program enabler service system may provide a function of determining a question response order, that is, a participation order with respect to group chatting participants on the mobile IM. That is, the program enabler service system supports a function capable of determining a participation order by providing a message or a separate UI with respect to a question for which users participating in a group need to sequentially input answers. As an example, referring to FIG. 28, the program enabler service system may directly receive a participation order 2801 from each user participating in a program chatting room through a number input, and may register a question response order 2802 for each user within the program chatting room. As another example, referring to FIG. 29, the program enabler service system may display a separate UI 2901 on a screen of a program chatting room to receive a participation order for each user. Here, the program enabler service system may provide the UI 2901 for inputting a participation order based on the number of participants in the program chatting room, and may register a question response order 2902 for each user within the program chatting room based on a selection of the user through the UI 2901. As still another example, the program enabler service system may randomly determine a question response order within the program chatting room. For example, referring to FIG. 30, when a time limit set for inputting a participation order is exceeded, the program enabler service system may randomly determine and register a question response order 3002 for each user within the program chatting room. Accordingly, the program enabler service system may determine a question response order for each user based on the user input result when all the responses to the participation order are input from users. Alternatively, when the limit time is exceeded, the program enabler service system may randomly determine a question response order for each user, thereby providing the message 2802, 2902, or 3002 indicating whether a question response order is registered and a question response order for each user to be verifiable by users.

When a user response to the question given in operation S2513 is received after the hint of the question is given, the program enabler service system may determine whether the user response is a correct answer or an incorrect answer, and may record the determination result for each user (S2515 through S2518). In this instance, the program enabler service system may determine whether a retry opportunity is available with respect to a user having input an incorrect answer, and may receive again a response to the question only from a user having the retry opportunity. Also, in the case of a group participation in the broadcast program, the program enabler service system may receive a user response in order defined in the program chatting room. When a final response is input from a user corresponding to a last order, the program enabler service system may record user responses based on a group unit by recording a correct answer or an incorrect answer for each user and group chatting room information.

Figure 31:
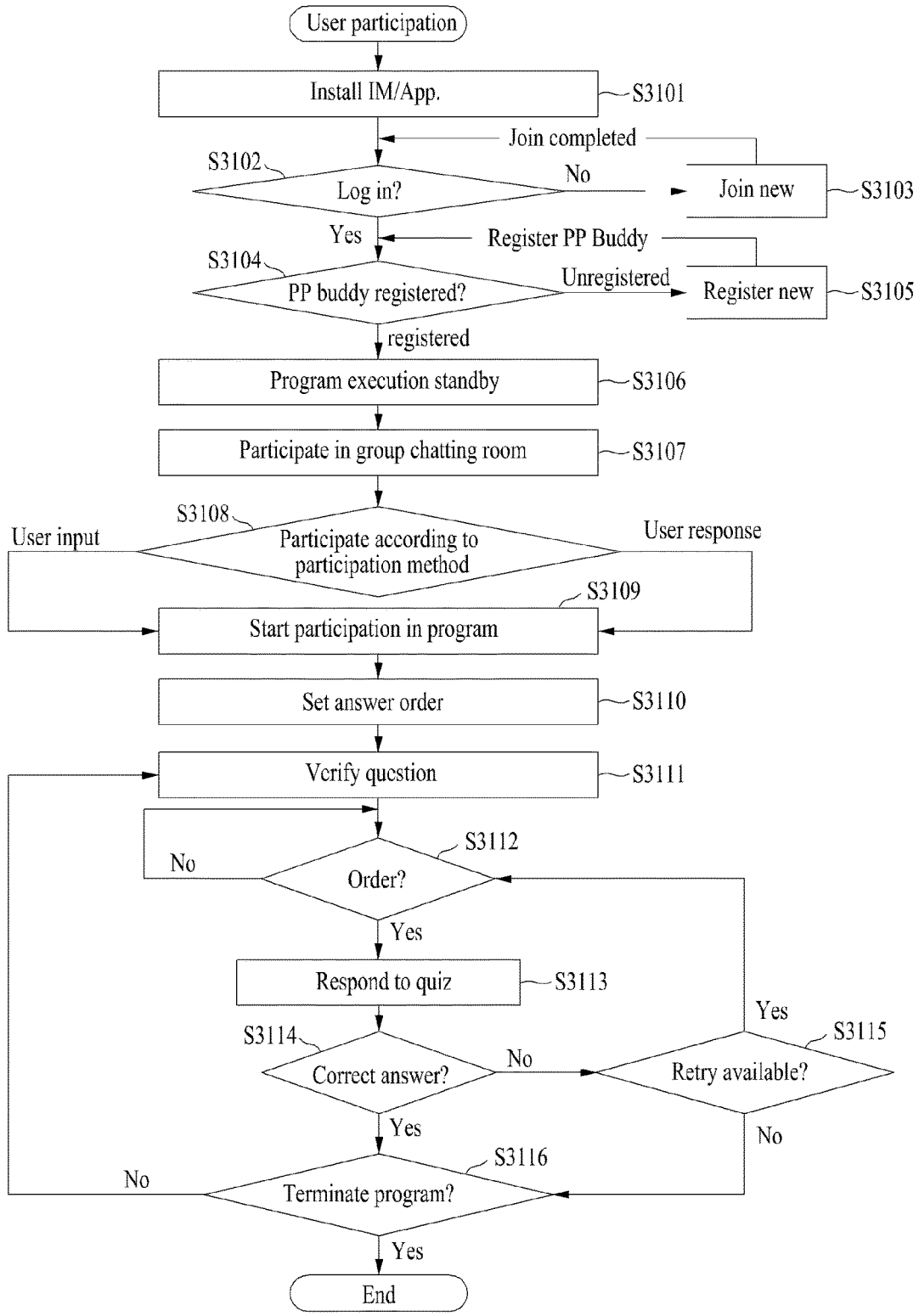
FIG. 31 is a flowchart illustrating a method in which a user participates in a program through a mobile IM using a terminal of the user, in a program enabler service method according to an embodiment of the present invention.

FIG. 31 is a flowchart illustrating a method of allowing a user to participate in a program on a terminal of the user according to an embodiment of the present invention.

Referring to FIG. 31, a user terminal installs a mobile IM application in response to a request of a user (S3101). In this instance, the mobile IM application, as a messenger program supported in a mobile environment such as Kakao Talk, Line, Tick Talk, and NATE ON, may indicate any type of messengers generally used. To participate in an interactive service program, the user needs to register a buddy ID of a corresponding manager to a buddy list through the mobile IM application installed in the terminal (S3102 through S3105).

The user terminal maintains a program execution standby state when an actual broadcast program is not initiated yet (S3106). Here, the program execution standby state may indicate a situation up to a time designated by the program manager (for example, 5 minutes before the program start).

When the actual broadcast program starts, the user terminal may execute a chatting of the corresponding program using a program participation method designated by the program manager for triggering the user to participate in a program through the mobile IM application (S3107 through S3109). In the present embodiment, the chatting room of the corresponding program may be executed using a predetermined character string input standby method (FIG. 26) and a buddy list target push method (FIG. 27). That is, in the case of using the predetermined character string input standby method, the user may participate in the broadcast program by directly executing a program chatting room using a program ID and by inputting a predetermined character string in the program chatting room. Also, in the case of using the buddy list target push method, the user may participate in the broadcast program by executing a program chatting room at a point in time when a participation request message is received from the program enabler service system in a state in which the user has registered the program ID to a buddy list of the user in advance. Also, when an actual broadcast program gives a question requiring a group participation or when a user participates as a group together with a plurality of friends irrespective of a question type, the user terminal may participate in the group chatting room of the broadcast program. Accordingly, in the case of the group participation, the user terminal may set a question response order that is an answer order to a given question based on a user designation through a function of determining a participation order (S3110).

The user terminal may receive a question given during a program execution from the program enabler service system, and may display the received question through a program chatting room of the mobile IM (S3111). Accordingly, the user may verify the question through a TV screen on which the corresponding program is on air and a conversation window of the mobile IM. In this instance, the user terminal may verify an order of the user based on the question response order for each user within the program chatting room (S3112). The program enabler service system may inform a corresponding user of a user order for inputting a response through a message based on the question response order defined within the program chatting room. Also, when the given question is a hint giving question, the user terminal may receive a hint giving query from the program enabler service system and may display the hint query through the program chatting room. Here, the user terminal may receive a response to the hint query from the user and may transfer the received response to the program enabler service system. The program enabler service system may display the hint of the question in the program chatting room to be verified by the user, based on a hint query matching result.

Figure 32:
Figure 33:
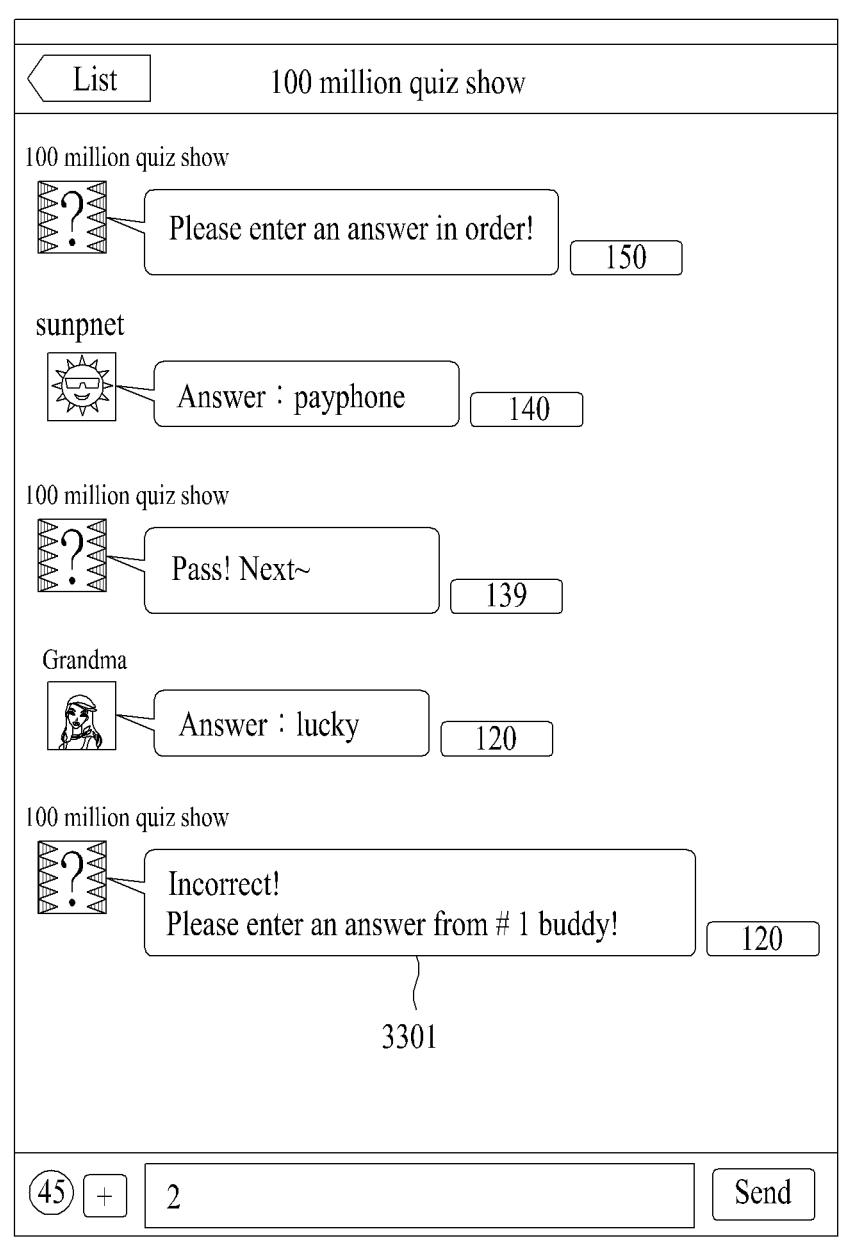

When the user inputs the response to the question, the user terminal may transfer the response to the program enabler service system and the program enabler service system may display a result of verifying whether the response is a correct answer or an incorrect answer and whether the user is allowed to make a retry, on the program chatting room to be verifiable by the user (S3113 and S3114). Also, referring to FIGS. 32 and 33, the user terminal may display the retry availability (3201) (3301) provided from the program enabler service system (S3113 and S3114), on the program chatting room to be verifiable by the user (S3115). In the present embodiment, in the case of participating in a broadcast program based a group unit, when each user individually inputs a response to a question, whether the response is a correct answer may be filtered based on a designed order. When the response is input out of order, the response may be processed as an incorrect answer. Also, different processing may be performed for each user, such as limiting a retry opportunity to a user having input an incorrect answer, based on the examiner intent. Further, in the present embodiment, when displaying messages exchanged between the program enabler service system and a user on a screen of a group chatting room, a message created by the user may be replaced with a predetermined character string and the replaced character string may be displayed not to be exposed to other participants.

The user terminal may maintain the user's participation in the program until the program is terminated (S3116). That is, even though the user executes another application after participating in the program chatting room, the program enabler service system recognizes that the user is to maintain the participation in the corresponding program unless the user selects a separate program participation end. Also, when a corresponding episode of the program is terminated after the user participates in the program chatting room, the program enabler service system may terminate an instance of a corresponding service and the user may leave the participating program chatting room. In this instance, when the user is to participate in a subsequent episode of the program in a state of maintaining a chatting room after the program is terminated, the user needs to express the intent regarding whether to participate in this episode. In this case, similarly, a participation character string input request message may be sent to the user and the user may participate in the corresponding program by inputting a character string.

The program enabler service method described above with reference to FIGS. 23 through 33 may include a reduced number of operations or additional operations. Also, at least two operations may be combined and orders or locations of operations may be changed.

As described above, according to embodiments of the present invention, there is provided a system in which an editor for producing an interactive broadcast program and an enabler capable of associating and thereby executing a broadcast program produced through the editor with existing communication channels are combined and thus, it is possible to format program information and thereby improve the production and management efficiency. Also, it is possible to easily and conveniently provide various communication functions required for the interactive broadcast program.

The methods according to embodiments of the present invention may be recorded in non-transitory computer-readable media including program instructions to implement various operations embodied by a computer. The media may also include, alone or in combination with the program instructions, data files, data structures, and the like. The program instructions recorded in the media may be those specially designed and constructed for the purposes of the present invention, or they may be of the kind well-known and available to shoes having skill in the computer software arts. Also, the file systems may be recorded in the non-transitory computer readable media.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A program enabler service system for providing an interactive service for allowing a user to participate in a broadcast program, the system comprising:
   a program creator configured to provide a tool for receiving information associated with the broadcast program, and to create the information received through the tool in a script format for the broadcast program;
   a program executor configured to read the information created in the script format in interaction with the broadcast program, and to provide the information to the user using a communication channel provided from a service enabler;
   a service connector configured to connect a communication service platform of the service enabler and the program executor; and
   a mobile IM enabler as the service enabler configured to provide the communication channel with the user, and to open a program chatting room on a mobile IM for the broadcast program by means of a buddy setting with the user,
   wherein the program executor is configured to read the information created in the script format in interaction with the mobile IM enabler, and to provide the information to the user in the program chatting room, and
   wherein the mobile IM enabler is configured to create a program ID associated with the broadcast program that is a buddy ID used on the mobile IM for exchanging messages in the program chatting room with users of the mobile IM, to transfer a message in the manner of a message push to a buddy user having set in advance a buddy relationship with the program ID from among the users of the mobile IM, the user being the buddy user and the message being for requesting the buddy user to participate in the broadcast program through the program chatting room, and to open the program chatting room in which the buddy user is capable of participating.

2. The system of claim 1, wherein the program creator is configured to provide a function of inputting basic information corresponding to the broadcast program, a function of selecting the service enabler, and a function of inputting an interactive object in which the user is capable of participating, through the tool.

3. The system of claim 2, wherein the interactive object is provided in at least one form among a quiz, a survey, a vote, and an application.

4. The system of claim 1, wherein the program creator is configured to provide a function of creating a quiz to be given in the broadcast program, a function of setting at least one option among a reward, a hint, an image, an advertisement, and a retry providing condition for each quiz, and a function of setting a quiz giving order or an interacting condition, through the tool.

5. The system of claim 1, wherein the program creator is configured to script the information for each episode of the broadcast program.

6. The system of claim 1, wherein the program executor is configured to interact with a social service providing the communication channel with the user.

7. The system of claim 1, wherein the program executor comprises:
   a portal module configured to provide a web-based portal environment interacting with the service enabler and accessible by a program manager;
   a management module configured to manage a service lifecycle of the service enabler;
   an execution engine configured to provide an interactive service of the broadcast program by combining the information created in the script format and a communication service in an enabler format;
   a recording module configured to record an event of the service enabler in association with the broadcast program;
   a monitor module configured to monitor a participation status of the broadcast program through the service enabler; and
   a bus module configured to perform data transmission and reception with the user through the service enabler.

8. The system of claim 7, wherein the monitor module is configured to provide at least one of a function of providing at least one of a real number of users participating in the broadcast program, a participation status for each region, a participation status for each age, and a participation status for each sex, a function of providing a participation status for each of the information, a function of providing detailed participation information for each user participating in the broadcast program, and a function of supporting a message send or a call connection with respect to said each user participating in the broadcast program.

9. The system of claim 1, wherein the program chatting room allows at least two users to participate based on a group unit with respect to the broadcast program, and
   wherein the program executor is configured to provide the information to a user participating in a corresponding group in the program chatting room.

10. The system of claim 9, wherein the mobile IM enabler is configured to set the number of users capable of participating in the program chatting room, and to limit the number of users participating in the group based on the set number of members.

11. The system of claim 9, wherein the information is at least one interactive object among a quiz, a survey, a vote, and an application requiring a response of the user, and
   the program executor is configured to transfer a message associated with the interactive object to a user that is to participate in a corresponding group in the program chatting room, and to receive a response to the interactive object from each user in the program chatting room.

12. The system of claim 11, wherein the program executor is configured to replace a response to the interactive object received from each user with a predetermined character string, and
   a mobile IP application to be installed in a terminal of the user is configured to display the predetermined character string on a screen of the program chatting room, instead of displaying the response to the interactive object.

13. The system of claim 1, wherein the mobile IM enabler comprises:
   an interface module configured to provide a function of verifying a list of users participating in the broadcast program, a message send/reception status associated with the information, or presence/absence of a response from the user, in a graphical user interface (GUI) form;

a message control module configured to provide a function of sending a message associated with the information to the user and a function of triggering a participation intent of the user with respect to the broadcast program through message matching, determining presence/absence of a response from the user to the information, or sending a predetermined message to the user;

a buddy management module configured to provide a function of managing a buddy list having set a relationships based on an identifier (ID) on a messenger created by a program manager with respect to the broadcast program;

a chatting room control module configured to provide a function of opening a program chatting room for communication with a user comprised in the buddy list; and a response recording module configured to provide a function of recording a response of the user in the program chatting room for communication with the user comprised in the buddy list.

14. The system of claim 1, wherein when the information is a quiz given in the broadcast program, the mobile IM enabler is configured to transfer a message associated with the quiz to the user or receive an answer to the quiz from the user through the program chatting room.

15. The system of claim 1, wherein the mobile IM enabler is configured to open the program chatting room based on the program ID to fit for an air time of the broadcast program.

16. The system of claim 1, wherein the mobile IM enabler is configured to set the user as the buddy user and to open the program chatting room, when a character string indicating an intent of participating in the broadcast program is received from the user.

17. A program enabler service system for providing an interactive service for allowing a user to participate in a broadcast program, the system comprising:

a program creator configured to provide a tool for receiving information associated with the broadcast program, and to create the information received through the tool in a script format for the broadcast program;

a mobile instant messenger (IM) enabler configured to provide a communication channel with the user and to open a program chatting room on a mobile IM for the broadcast program by means of a buddy setting with the user;

a program executor configured to read the information created in the script format in interaction with the broadcast program, and to provide the information to the user in the program chatting room by the mobile IM enabler; and a service connector configured to connect a communication service platform of the mobile IM enabler and the program executor, wherein the mobile IM enabler is configured to create a program ID associated with the broadcast program that is a buddy ID used on the mobile IM for exchanging messages in the program chatting room with users of the mobile IM, to transfer a message in the manner of a message push to a buddy user having set in advance a buddy relationship with the program ID from among the users of the mobile IM, the user being the buddy user and the message being for requesting the buddy user to participate in the broadcast program through the program chatting room, and to open the program chatting room in which the buddy user is capable of participating.

18. A program enabler service method for providing an interactive service for allowing a user to participate in a broadcast program, the method comprising:

receiving information associated with the broadcast program, and creating the information in a script format for the broadcast program;

opening a chatting room on a mobile IM for the broadcast program by means of a buddy setting with the user using a mobile instant messenger (IM) enabler; and reading the information created in the script format in interaction with the broadcast program, and providing the information to the user in the chatting room, wherein the opening the chatting room includes, creating a program ID associated with the broadcast program that is a buddy ID used on the mobile IM for exchanging messages in the program chatting room with users of the mobile IM, transferring a message in the manner of a message push to a buddy user having set in advance a buddy relationship with the program ID from among the users of the mobile IM, the user being the buddy user and the message being for requesting the buddy user to participate in the broadcast program through the program chatting room, and opening the program chatting room in which the buddy user is capable of participating.

* * * * *